(12) United States Patent
Reeve

(10) Patent No.: US 7,961,626 B2
(45) Date of Patent: Jun. 14, 2011

(54) RESILIENT NETWORK

(75) Inventor: Andrew Reeve, Winchester (GB)

(73) Assignee: Roke Manor Research Limited, Romsey (GB)

( * ) Notice: Subject to any disclaimer, the term of this patent is extended or adjusted under 35 U.S.C. 154(b) by 1086 days.

(21) Appl. No.: 11/515,904

(22) Filed: Sep. 6, 2006

(65) Prior Publication Data

US 2007/0070909 A1  Mar. 29, 2007

(30) Foreign Application Priority Data

Sep. 27, 2005  (GB) .................................. 0519648.0

(51) Int. Cl.
H04L 12/28 (2006.01)

(52) U.S. Cl. ........ 370/238; 370/235; 370/389; 370/401; 709/238

(58) Field of Classification Search .................. None
See application file for complete search history.

(56) References Cited

U.S. PATENT DOCUMENTS

| 5,559,959 | A |   | 9/1996 | Foglar |   |
|---|---|---|---|---|---|
| 6,167,438 | A | * | 12/2000 | Yates et al. | 709/216 |
| 6,751,746 | B1 |   | 6/2004 | Jain et al. |   |
| 6,928,484 | B1 |   | 8/2005 | Huai et al. |   |
| 7,406,032 | B2 | * | 7/2008 | Li et al. | 370/217 |
| 2002/0065936 | A1 |   | 5/2002 | Schiuma |   |
| 2003/0193898 | A1 | * | 10/2003 | Wong et al. | 370/252 |
| 2004/0042473 | A1 |   | 3/2004 | Park et al. |   |
| 2004/0190445 | A1 | * | 9/2004 | Dziong et al. | 370/225 |
| 2004/0246901 | A1 |   | 12/2004 | Zhang et al. |   |
| 2004/0258064 | A1 |   | 12/2004 | Nakamura et al. |   |
| 2005/0111418 | A1 | * | 5/2005 | Yang et al. | 370/338 |
| 2006/0013177 | A1 | * | 1/2006 | Saito | 370/338 |
| 2006/0221834 | A1 |   | 10/2006 | Schollmeier et al. |   |
| 2006/0248588 | A1 | * | 11/2006 | Jayaraman | 726/22 |

FOREIGN PATENT DOCUMENTS

| EP | 1289208 | * | 3/2003 |
| EP | 1294142 | * | 3/2003 |
| WO | WO 2004/077755 A1 |   | 9/2004 |

OTHER PUBLICATIONS

Chao Gao et al., "Least-Hop Routing Analysis of On-Demand Routing Protocols", Proc. $1^{st}$ Internat. Symposium on Wireless Communication Systems, Sep. 20-22, 2004, Mauritius, pub. IEEE, US, ISBN 0-7803-8472-5, pp. 215-219.
British Search Report dated Nov. 15, 2007 (one (1) page).
British Search Report dated Nov. 16, 2007 (one (1) page).
Srinivas, A., et al., "Minimum Energy Disjoint Path Routing in Wireless Ad-hoc Networks", Proc. MobiCom '03, Sep. 14-19, 2003, pp. 122-133, San Diego, CA.
Great Britain Search Report dated Nov. 21, 2006 (one (1) page).

* cited by examiner

Primary Examiner — Ayaz R Sheikh
Assistant Examiner — Nicholas Sloms
(74) Attorney, Agent, or Firm — Crowell & Moring LLP

(57) ABSTRACT

A network resilient to at least two points of failure comprises a plurality of nodes. A first path between a source node and a destination node is determined and a second path between a source node and a destination node is determined. The first and second paths are node-disjoint.

7 Claims, 18 Drawing Sheets

RESILIENT NETWORK

This invention relates to a network resilient to at least two points of failure, in particular one which uses an ad hoc on-demand resilient path (AORP) protocol to set up and maintain resilient label switched paths (LSP).

For the purpose of this application, the following terms are used. A route is an ordered list of links connecting two nodes; a bypass is an ordered list of links connecting two nodes avoiding a set of nodes and or links; a virtual path is a logical path between a source and a destination node whose physical path through the network varies in time; an active path is the current path between a source and a destination node which should be used for transferring data packets belonging to a virtual path, the current instantiation of the virtual path; a section is part of a path; a backup section is a section which is available to replace a protected section; a resilient virtual path is a logical connection created to provide reliable unidirectional data transfer between a source node and a destination node; a path partner is one of a pair of disjoint paths used to provide a resilient virtual path.

In accordance with a first aspect of the present invention, a network resilient to at least two points of failure comprises a plurality of nodes; wherein a first path between a source node and a destination node is determined; wherein a second path between a source node and a destination node is determined; and wherein the first and second paths are node-disjoint.

Preferably, each node in the path has a primary link and a bypass to a subsequent node; and wherein, in use, each node determines the validity of its primary link and if that is not valid, the node switches to the bypass.

Preferably, a bypass of the first path is disjoint with the second path.

Similarly, a bypass of the second path is disjoint with the first path.

Preferably, the node disjoint paths are set up by a routing protocol, which adapts a predetermined metric in each path.

Preferably the predetermined metric is to minimise the number of hops; or to maximise power.

For both disjoint paths and bypasses, the general goal is to minimize cost according to some metric. In one example, the metric is the number of hops, although other metrics are useful such as maximising power along the path.

Preferably, at least one of the nodes in the path does not have a fixed geographical location.

Preferably, transmission of a message packet from the source node may begin before the bypasses are set for each node in the path.

Although, the transmission of messages can start as soon as the first shortest path is set up, it is important that a disjoint pair and the bypasses are set up as soon as possible to provide resilience throughout.

Preferably, the message packet includes a label; and each node switches the message packet to the primary link or the bypass according to the label.

Preferably, the label is used to derive an address in a memory store and each primary link and bypass link a node is stored in the memory store.

An example of this is an index into a RAM table.

In accordance with a second aspect of the present invention, a method of determining a shortest path in a network comprising a plurality of nodes comprises broadcasting a path request message from the source node; and propagating the path request message through the network from node to node; wherein, on first receipt of the path request message at each node, a hop count and broadcast identifier are stored; wherein, if a path request message is received a second time at any node, it is only propagated if the new hop count is less than the stored hop count; and wherein the destination node replies to the source node along the path with the lowest hop count to set up the shortest path.

Preferably, the method comprises determining a first shortest path and allocating each link in the path a cost of +1; determining a second shortest path and allocating to each link in that path which is also in the first shortest path a cost of −1; sending a path reply from the destination node back to the source node to create the disjoint pair from links belonging to the first and second shortest paths, but which do not belong to both paths.

In accordance with a third aspect of the present invention, a method of operating a network resilient to at least two points of failure; the method comprising setting first and second node-disjoint paths between a source node and a destination node; setting a primary link and a bypass at each node in the paths; propagating a message packet from the source node; at each subsequent node, checking validity of the primary link; and if the primary link is not valid, switching the message packet to the bypass.

Preferably, the first and second node-disjoint paths are determined according to the method of claim 1.

Preferably, the message packet includes a label and each node switches the message packet to the primary link or the bypass, according to the label.

Preferably, the label is used to derive an address in a memory store; and the node reads data from the memory store relating to the primary link or the bypass according to the label.

Preferably, the method further comprises setting bypasses at each node and if the bypass is determined to be shorter, then converting the bypass to be the primary link at that node.

In one example, the bypass shortens the overall path, an error is simulated at the point of local repair so that the path is re-routed along it.

In another example, the BREQ mutates into a PREQ and the shorter path gets set up An example of a resilient network and a method of setting up a resilient network according to the present invention will now be described with reference to the accompanying drawings in which.

Figure 1:
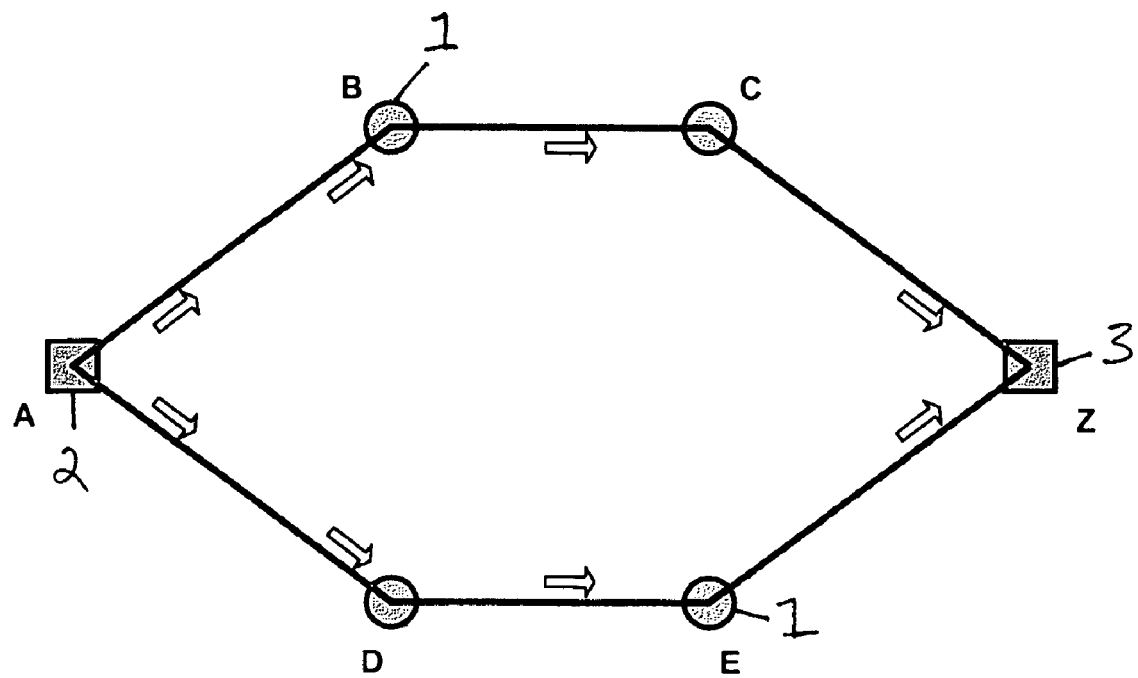
FIG. 1 shows a splitter recombiner technique.

FIG. 1 illustrates how splitter re-combiner technique resilience to network faults is provided by transmitting two copies of each packet. Each copy follows a separate path through one or more nodes 1 to its destination. A receiver selects one copy of each packet in order to reconstruct the original packet stream. Network faults will cause packet loss, but as long as both routes are not affected, at least one copy of each packet will be received. A source node 2 is labelled A and the destination node 3 is labelled Z, a convention which is used in the network figures throughout this description. Two routes are used for communication from A to Z, A-B-C-Z and A-D-E-Z. A sends a copy of every packet on each route and Z selects one copy of every packet received.

In order that the technique provides resilience to single points of failure, the two routes must be node-disjoint. Furthermore, in order to provide protection from more than one point of failure, bypasses for individual nodes are setup so that each path can effect local repair. In addition, in order to avoid packet loss or excessive jitter owing to congestion at a node or link, bandwidth resources must be reserved along each route. The combination of a route and a bandwidth reservation is known as a path. The two members of a disjoint path pair are known as partner paths. A routing protocol is employed to set up node-disjoint path pairs with bandwidth reservations. The concept includes the provision of routing algorithms and protocols to set up protected disjoint path pairs.

Figure 2:
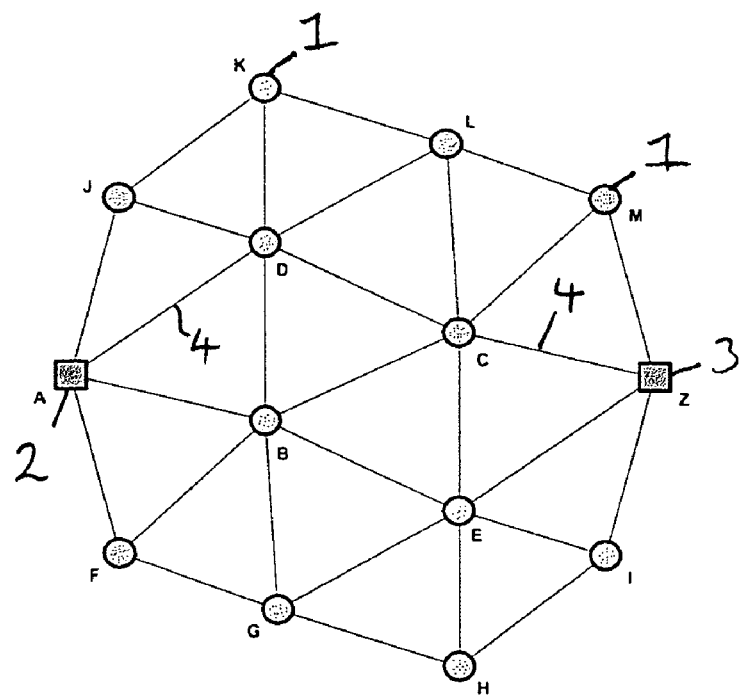
FIG. 2 shows an example topology for a network according to the present invention.

Node-disjoint path pair routing is illustrated in FIG. 2 which provides an example topology used to describe the routing concepts. By convention A and Z are the source 2 and destination 3 nodes of a traffic stream. Nodes B to M are intermediate nodes 1 for this connection. The lines connecting nodes are operational links 4. It is assumed that a broadcast wireless technique is used, but the signal reception between certain pairs of nodes, for example D and E, is too poor to allow communication.

Figure 3:
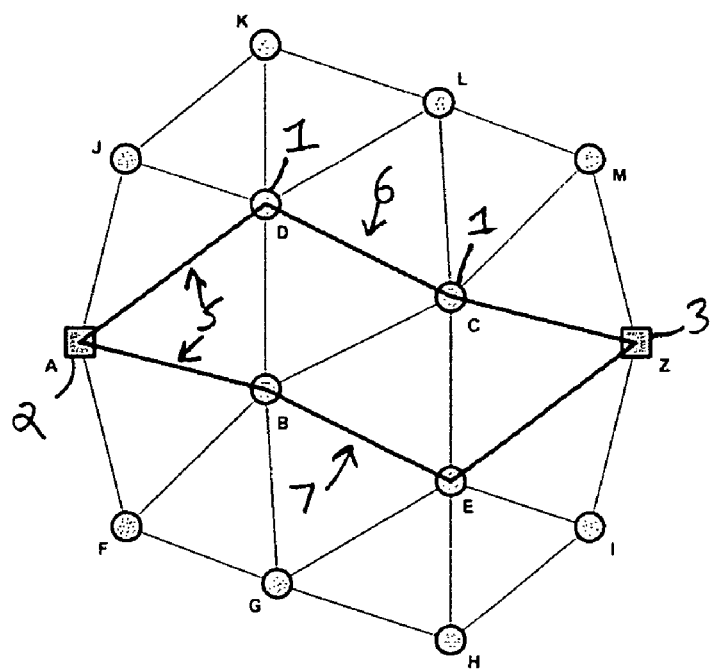
FIG. 3 illustrates a node disjoint path pair connecting a source and a destination node.

FIG. 3 shows the shortest node-disjoint path pair 5 from A to Z, {A-D-C-Z, A-B-E-Z}. Other node-disjoint pairs are possible, but they are longer and it is important to minimize the number of hops in order to minimize overall battery and link bandwidth consumption.

Figure 4:
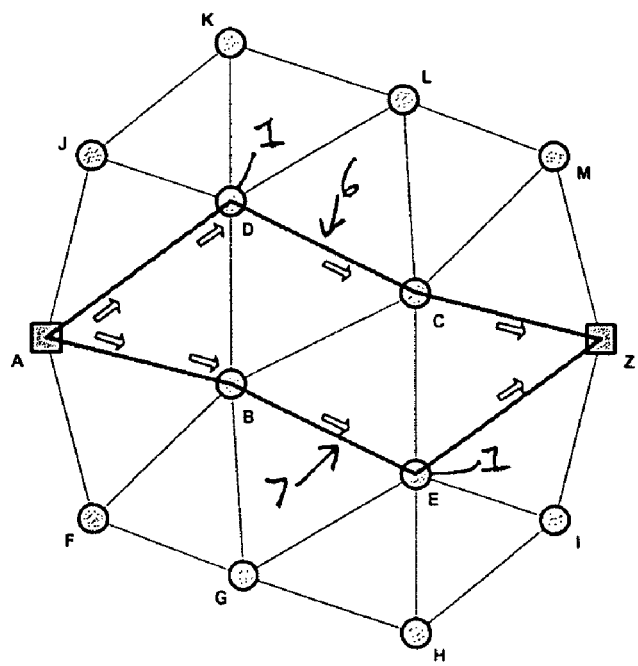
FIG. 4 illustrates replication of data across disjoint paths.

FIG. 4 illustrates the replication of data across the two disjoint paths 6, 7. In this example, communication from A to Z is unaffected by the failure of one of nodes 1 B, C, D and E. No packet loss is seen by Z. This contrasts with schemes which do not perform replication, but send packets over one path, the primary path, and switch over to a disjoint backup path in the case of error. In such schemes, the node detecting the error must inform the source node using signalling before the source can switch to the backup path. Packets are lost during this time.

Figure 5:
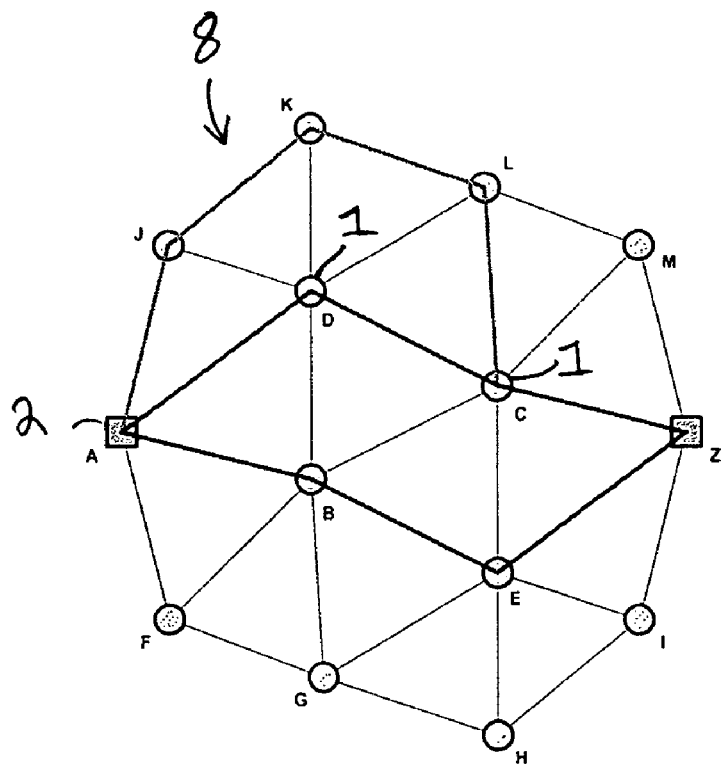
FIG. 5 shows a fast re-route bypass for Node D.
Figure 6:
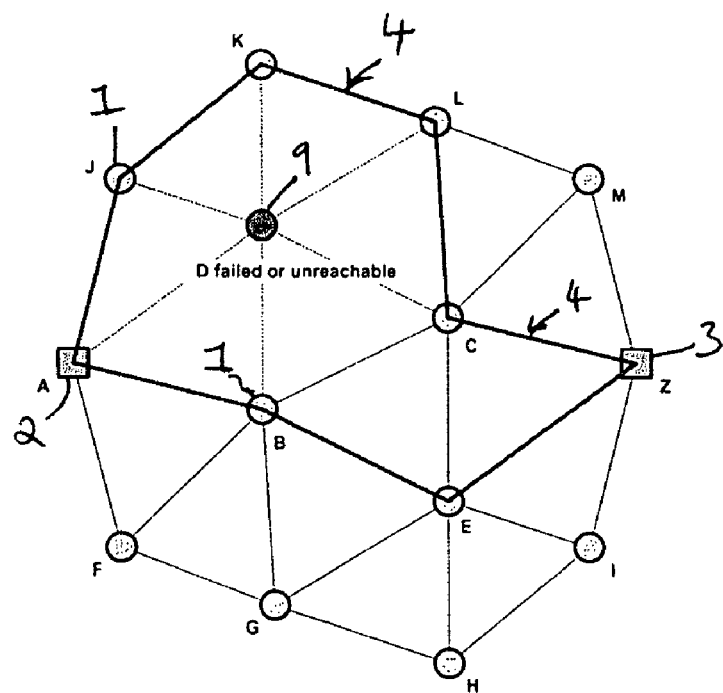
FIG. 6 illustrates local repair around the failed Node D of FIG. 5.

Local repair using fast re-route addresses the problem that the scheme so far outlined suffers from a lack of resilience to multiple points of failure, a situation which is relatively likely in the target network type. For instance, if nodes D and E fail, both paths are inoperable and communication is interrupted. Resilience is improved by the use of a local repair technique employing multi-protocol label switching (MPLS) fast re-route. When a failure occurs on a path, the path is rerouted around the failure using a previously established bypass. Local repair is managed by a node termed the Point of Local Repair (PLR). The PLR is responsible for setting up the bypass and monitoring the status of the link or node it protects. Repair is very rapid because it is enacted by the node monitoring the failed element using a pre-configured bypass. FIG. 5 shows the example of a bypass 8 A-J-K-L-C for D created by the source node A, the responsible PLR for D. FIG. 6 shows how the path A-D-C-Z is rerouted around the bypass following the failure of D, so that the path pair are now A-B-E-Z and A-J-K-L-C-Z, so excluding the failed or unreachable node 9.

Each node 1 on the disjoint path pair, with the exception of the destination 3, takes on the role of PLR for an adjacent downstream link and attached node. For the example disjoint path pair of FIG. 5, the protected nodes and the corresponding PLRs are as shown in Table 1 below. For the purpose of this example, it is assumed that each node uses only one communications media instance. This means that there is no need for a node to distinguish between failure of a neighbouring node 1 and failure of the corresponding communications link 4.

TABLE 1

Responsible Points of Local Repair

| protected node | point of local repair |
| --- | --- |
| D | A |
| C | D |
| B | A |
| E | B |

Figure 7:
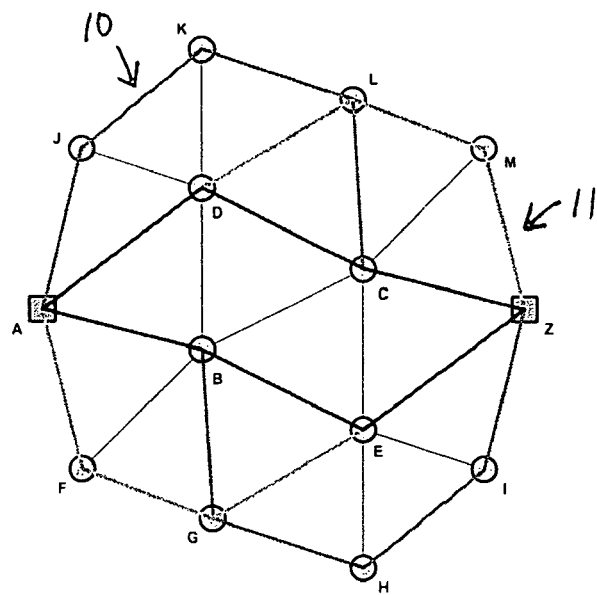
FIG. 7 shows fast re-route bypasses for all nodes on a primary path pair.

When the disjoint path pair is setup, each PLR sets up the bypasses for which it is responsible. See the example in FIG. 7 and Table 2 below. Thus, D sets up the bypass A-J-K-L-C 10, C sets up a bypass D-L-M-Z 11 and so on.

TABLE 2

Example Bypass Configuration

| protected node | point of local repair | bypass |
| --- | --- | --- |
| D | A | A-J-K-L-C |
| C | D | D-L-M-Z |
| B | A | A-F-G-E |
| E | B | B-G-H-I-Z |

Figure 8:
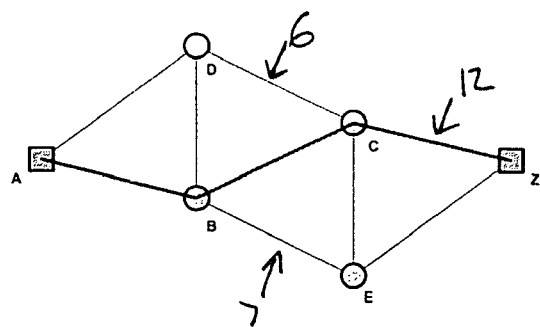
FIG. 8 is an example of a naïve algorithm causing blocking.

Routes for a disjoint path pair must be properly calculated. A naïve algorithm may not be able to find a disjoint pair even when one does exist. The obvious naïve approach is to first find a shortest path from source to destination and then find a second path which is disjoint from the first. Consider the reduced topology shown in FIG. 8. If the first path 12 from A to Z is chosen to be A-B-C-Z, which is one possible shortest path, then no second disjoint path remains. However as has been seen earlier, the paths A-D-C-Z 6 and A-B-E-Z 7 form a disjoint pair which the naïve algorithm is unable to find.

Figure 9:
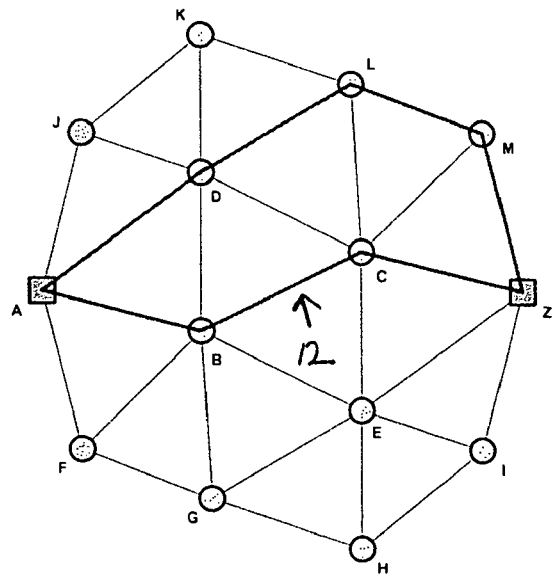
FIG. 9 is an example of a sub-optimal node-disjoint path pair.

A naïve algorithm may also produce sub-optimal routing. Consider the usual topology shown in FIG. 9. Employing the same naïve algorithm, if the first path from A to Z is chosen to be A-B-C-Z 12, which is one possible shortest path, then any second disjoint path must traverse at least 3 intermediate nodes so that the disjoint pair traverses 5 intermediate nodes in total. The optimal pair {A-D-C-Z 6, A-B-E-Z 7} traverses only 4 intermediate nodes. Minimizing the number of intermediate nodes traversed is an important consideration for wireless mobile networks where total battery power consumption must be kept to a minimum and where minimum path lengths will reduce the potential for packet loss or damage and minimizes jitter.

Figure 10:
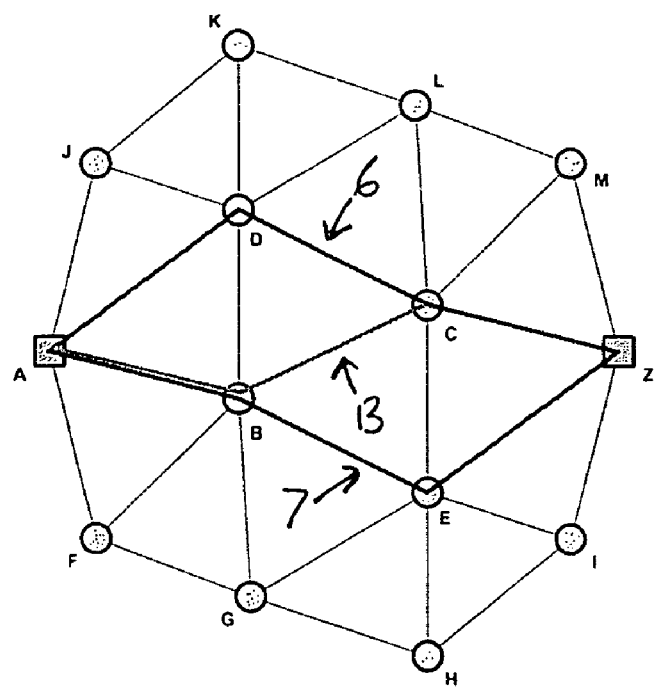
FIG. 10 is an example of an incorrect choice of fast re-route bypass.

Care must be taken when selecting the routes for bypasses protecting nodes on a disjoint path pair. The route taken by a bypass protecting part of a path must not coincide with any part of the partner path. If it did, the integrity of the disjoint path pair would be destroyed. Consider for example FIG. 10, where nodes A and Z are connected by a disjoint path pair 6, 7. The shortest bypass which protects node D is A-B-C 12, but this must not be chosen because B is coincident with the partner path 7. If D fails, the path pair is repaired to become {A-B-C-Z, A-B-E-Z} which is no longer disjoint since B is common to both members. The connection from A to Z is no longer protected against failure of B, and the link A B carries both copies of every packet.

The resulting architecture satisfies many requirements. The architecture is capable of autonomous operation, i.e. it must not rely on any central infrastructure; The U-plane of the architecture supports the transfer of IPv4 packets; and it is assumed that the concept is applicable to networks where there are nodes which cannot communicate directly with other nodes, so communication between nodes which cannot communicate directly is via intermediate nodes, that is, the method employs hop by hop packet transfer.

The type of networks for which the architecture is developed is inherently ad hoc in nature, so ad hoc routing needs to be supported. Ad hoc routing is required for a number of reasons. The nodes are mobile and so have changing connectivity relationships resulting in a changing and unpredictable topology. Even if the nodes are static, the requirement to plan the network in advance is an unnecessary overhead, so ad hoc routing avoids the requirement to pre-configure nodes and assign roles prior to each mission. Communication conditions and topography may not be known with sufficient accuracy in advance of deployment, so the network must continue to operate following unpredictable changes in circumstances.

The architecture needs to be able to support mobile nodes with nodes moving in and out of each others communications range resulting in a more or less rapidly changing network topology. In particular the architecture must support networks where typically any initial topology will not persist. The architecture includes link monitoring which performs timely local detection of failure to enable local repair using fast re-route. Preferably, the specified link monitoring technique provides a confidence level indication for operational links which allows the routing function to distinguish between links which are likely to be more or less long lived.

The total amount of traffic, both signalling and data, is kept to a minimum since packet processing by a node consumes battery power which is a limited resource and the total network bandwidth is a limited resource which must be conserved in order to maximize the number of connections that may be supported. Similarly, the number of hops taken by a path is kept to a minimum because packet processing by a node consumes battery power. The number of intermediate nodes that are burdened with supporting a path is minimised due to the limits on total network bandwidth. It is desirable that the number of links that provide bandwidth for a path are kept to a minimum; as the larger the number of nodes that a path traverses, the higher the probability that it will be affected by failure of a node or link.

Link failure due to mobility, changing environmental conditions and node loss are common events in the type of networks for which the architecture is designed, so resilience against multiple points of failure is required to address the increased probability of multiple points of failure on active paths in these networks. The system carries out open path discovery, whereby the routing function finds an open path between endpoints, if any such path exists.

Active-Active 1+1 Protection means that the architecture can support resilience through data duplication over two disjoint paths as described above. This means that a connection will not experience an outage on single point of failure. Fast re-route local repair of failed paths using pre-established bypasses is supported as described above. It is desirable that local repair using fast re-route is performed in less than 50 ms. This means that, subject to the topology, connections will experience less than 50 ms outage on the loss of more than 1 node or link.

Multiple protection levels, as shown in Table 3 are supported according to the combination of techniques employed.

TABLE 3

Protection Levels and Outage Times

| level | active-active 1 + 1 | fast re-route | outage on loss of single node | outage on loss of >1 node |
|---|---|---|---|---|
| 0 | no | no | undefined | undefined |
| 1 | no | yes | <50 ms | undefined |
| 2 | yes | no | NONE | undefined |
| 3 | yes | yes | NONE | <50 ms |

Bandwidth is reserved along a path in support of critical data streams and real-time quality of service (QoS). Wherever possible the architecture adapts or employs existing standards or draft standards to reduce development time, increase confidence and reduce standardisation and implementation time.

Referring to Table 3, bypass and partner paths are disjoint and for protection level 3, every bypass protecting part of a path must be disjoint from the partner path as described above. The point of local repair (PLR) and the other nodes through which a bypass is routed monitor the health of the bypass and if the bypass fails, the PLR is signalled, then the PLR sets up a replacement bypass in order to maintain the protection level.

Multi protocol label switching (MPLS) is employed since packet forwarding is simple and can be implemented with minimum processing overhead resulting in low power consumption and it can easily be implemented in an application specific integrated circuit (ASIC) which also helps to lower power consumption; MPLS also provides path routing and enables the fast re-route technique, as well as per path bandwidth reservation.

On the data path the MPLS label switching technique is employed. Each packet is prefixed by a shim header containing a label used by nodes to make forwarding decisions based on a simple table lookup. This allows implementation in hardware reducing power consumption.

In order to transfer packets from one node to another using the MPLS technique, a label switch path (LSP) must be setup between them. As part of the LSP setup and maintenance procedures, communication resource reservation can be performed as an essential part of an overall quality of service (QoS) strategy. This is an important advantage. LSPs are unidirectional in the sense that they only carry packets in one direction, from the source to the destination.

In a wireless ad-hoc network, the route taken by packets between a source and a destination will not be constant. Accordingly the concept of a virtual path is employed. A virtual path is a path between two nodes whose precise route through the network varies in time in response to changing network conditions. At any time, the current instantiation of the virtual path used for transferring data packets is termed the active path. An active path is realised by an LSP.

A reactive approach to routing is employed. This is based on the Ad hoc On-demand Distance Vector (AODV) protocol. This is chosen because it involves simple nodal behaviour and has lower signalling traffic which scales with the number of active LSPs. Fault tolerance and reduction of packet loss ratio during network state change is achieved by means of local repair using bypass LSPs. Within the internet engineering task force (IETF) this is termed a detour and the term bypass refers to a LSP which protects a number of LSPs. When a node on the active path detects a link failure, the path is immediately re-routed around a pre-established operational bypass, minimising the chance of losing packets.

The bypasses are setup when the virtual path is initially created. Each node and link on the active path is protected by at least one bypass. The links and nodes which provide a bypass are actively monitored to ensure its viability so that it provides an active standby for the section of the active path that it protects. Should a bypass fail, attempts to setup a replacement are immediately initiated to maximise that the chance that the virtual path is always fully protected. When a bypass is brought into service following the loss of an element that it protects, it becomes part of the active path, changing its route. Bypasses must now be setup for any newly added elements of the active path that are not currently protected.

As nodes move or go out of service and network conditions change, there is a danger that the route currently taken by the active path becomes sub-optimal. This is addressed in two ways. First, whenever a node detects that replacing a section of the active path with a bypass would reduce the total path cost, it performs the replacement. For the time being, the replaced section changes role to become a bypass. Second, the source will periodically initiate discovery of the current best route to the destination and replace the active path if that results in a sufficiently more optimal route. A more detailed description now follows. For simplicity, initially the case of a single path without disjoint partner is described and procedures for the setup and maintenance of disjoint pairs are discussed afterwards.

Figure 11:
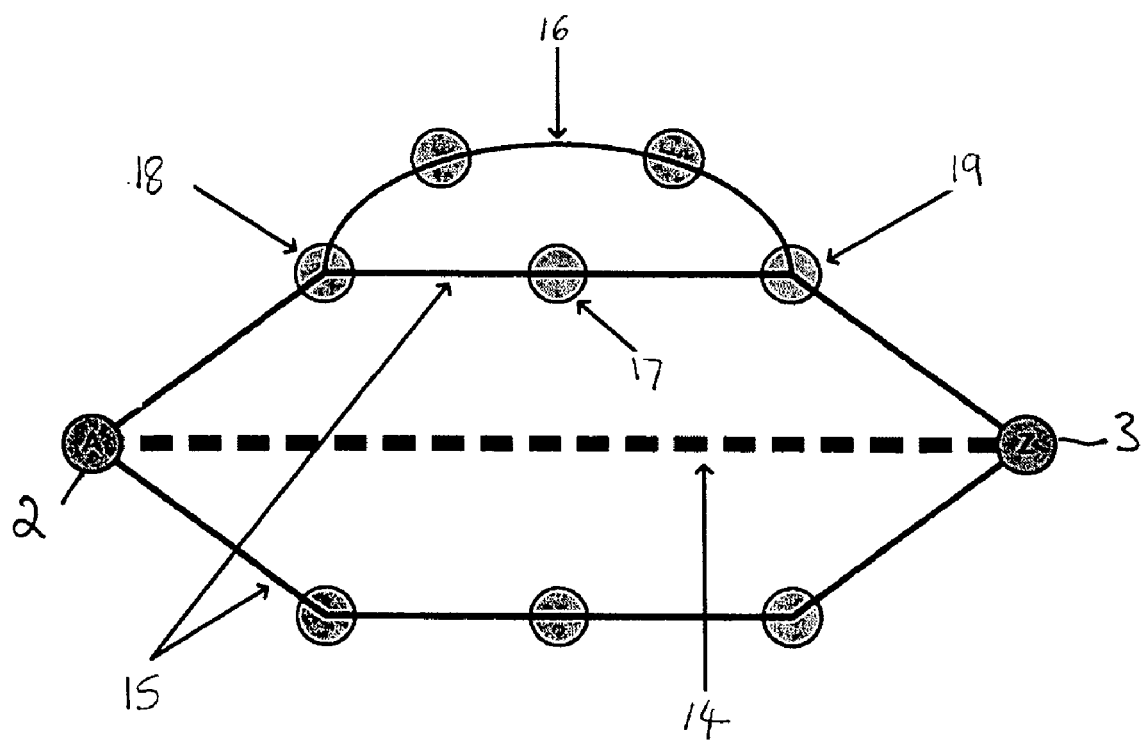
FIG. 11 illustrates a resilient virtual path.

FIG. 11 illustrates an example of a resilient virtual path. The following formal definitions will be used: A resilient virtual path (RVP) 14 is a logical connection created to provide reliable unidirectional data transfer between a source node A and a destination node Z. The disjoint paths used to carry a resilient virtual path are called path partners 15. Each path partner is a LSP. The route of a path partner can vary during the lifetime of a RVP as network topology changes. A bypass 16 is an LSP set up in advance to protect a node 17 on a path partner. The bypass is set up by the predecessor of the protected node. This node 18 is called the point of local repair (PLR). The node 19 downstream of the protected node at which the bypass rejoins the path partner is called the join point (JP).

In order to provide unambiguous and convenient identification of virtual paths, each path has a global path identifier (GPI) comprising the source node internet protocol (IP) address, the destination node IP address and a path identifier. The path identifier is chosen by the source to be unique to the source and destination pair. Source nodes must employ a suitable path identifier numbering strategy to ensure that ambiguity is avoided following re-boot.

A path sequence number (PSN) is used to identify the current path. The PSN is used in the correct routing of path partners and bypasses. The source initially sets the PSN to 0. The destination increments the PSN whenever it responds with a path reply (PREP) for a better path. The source increments the PSN whenever it re-initiates path setup on loss of both partners. The source will increment the PSN when activating a path pair following successful local repair which has modified the route. The PSN is used to detect out of date messages and is used to identify nodes on the current path during bypass setup.

Each disjoint path partner is identified by its own unique path partner identifier (PPID) which may take the value 0 or 1. The PREQ and BREQ messages are flooded across the network by means of broadcast. The broadcast identifier (BID) is used to identify duplicate messages and prevent their unnecessary propagation or processing. The source periodically re-broadcasts a path request (PREQ) message until a successful PREP is received. The BID is used to identify old versions of messages which have already been forwarded. The source increments the BID before each re-broadcast. Each node which is in receipt of a PREQ will discard it if it has a lower BID than that already seen or if the PREQ does not represent an improvement. A point of local repair periodically re-broadcasts a BREQ messages until a successful BREP is received. The BID is used to identify old versions of messages which have already been forwarded. The source increments the BID before each re-broadcast. Each node which is in receipt of a BREQ will discard it if it has a lower BID than that already seen or if the BREQ does not represent an improvement.

Figure 12:
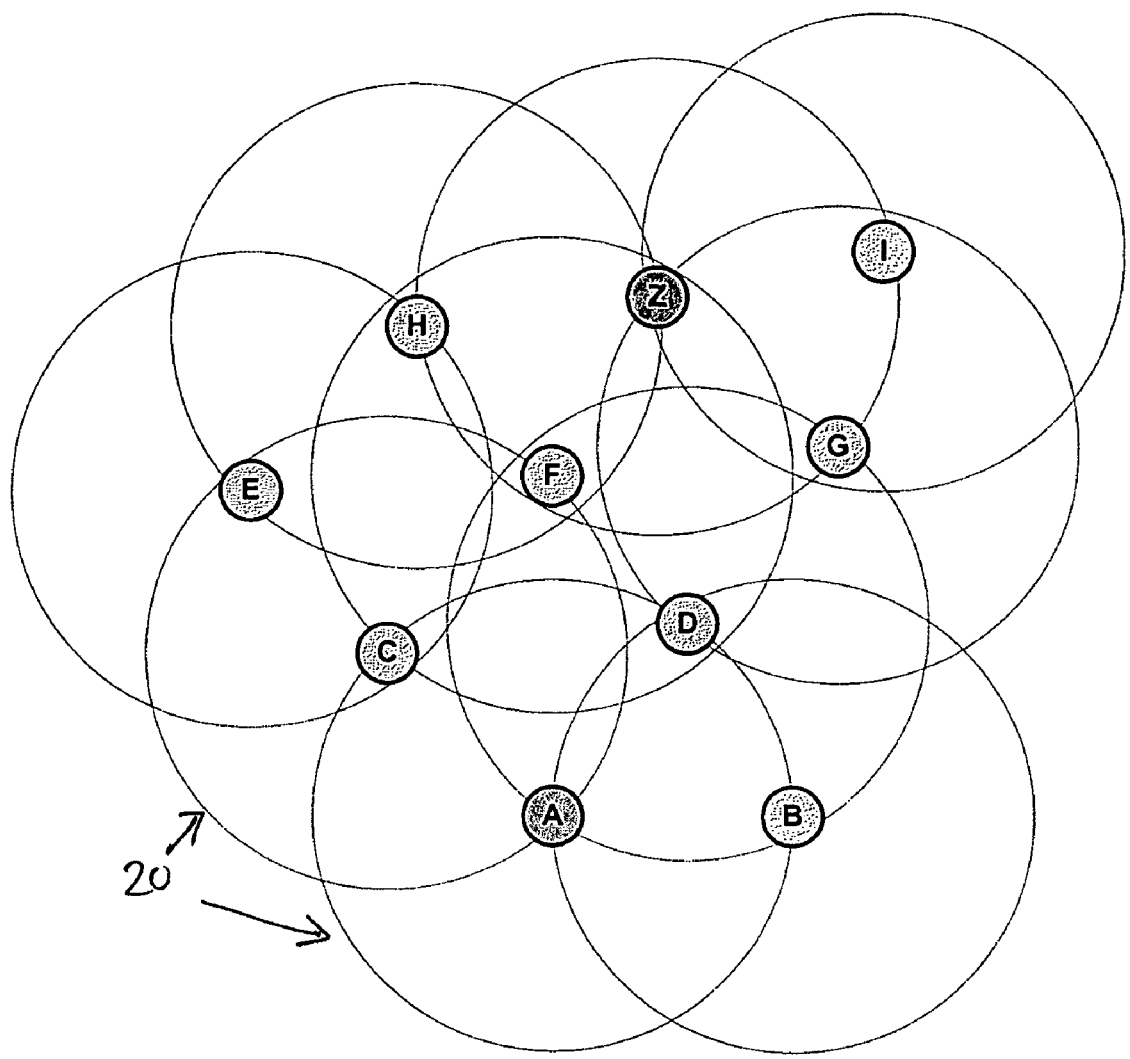
FIG. 12 illustrates physical connectivity in an example network.
Figure 13:
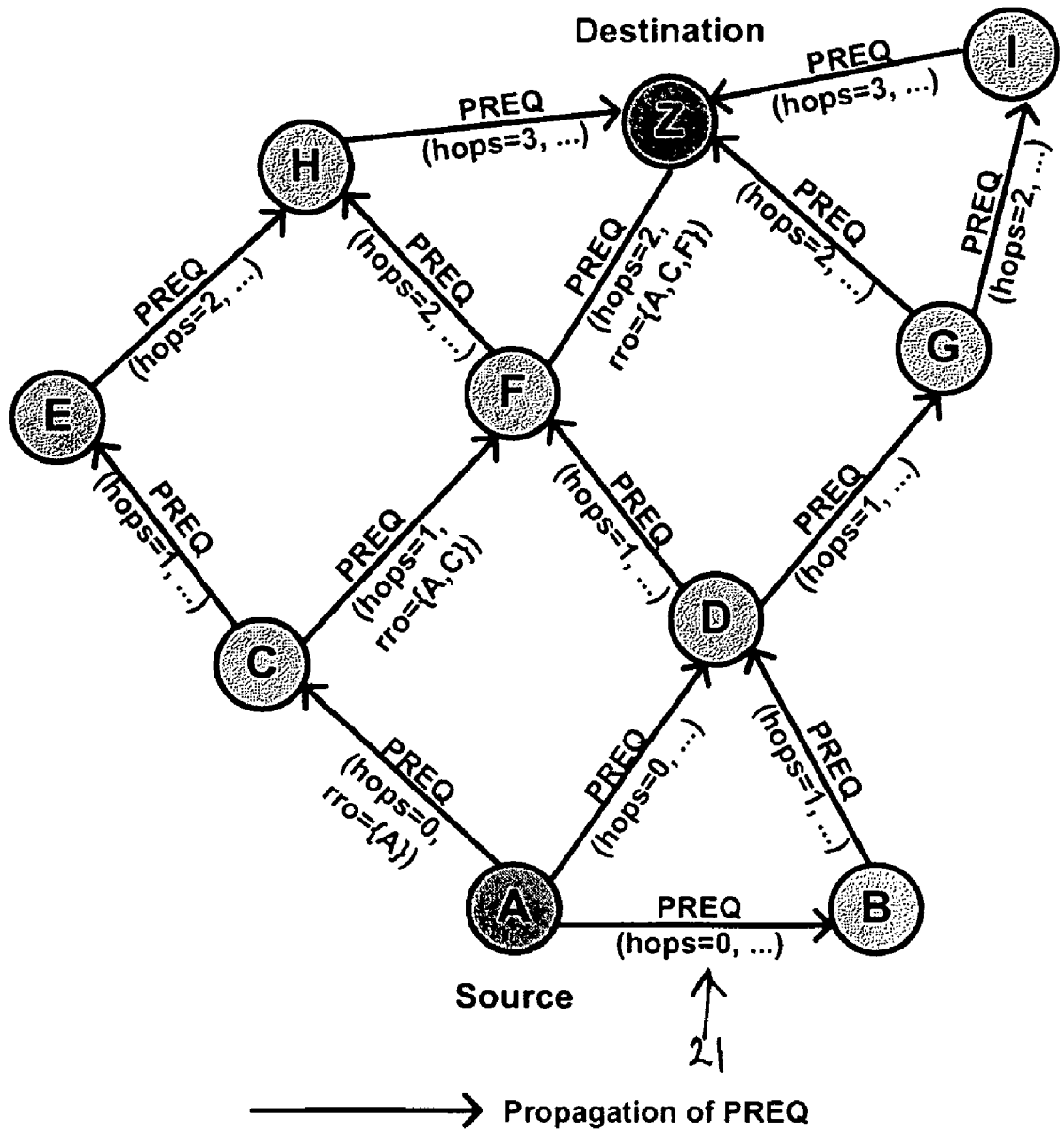
FIG. 13 illustrates propagation of a path request (PREQ) through the network of FIG. 12.

FIG. 12 shows the physical connectivity for the example network used below. The circles 20 centred on each node show the extent of a usable radio signal from the node. A transmitting node's packets can be reliably received by a receiving node if the transmitters signal fully or partially overlaps the receiver. The figure shows an idealised situation in which the transmit and receive capabilities of all nodes are identical and in which signal propagation is independent of location. For example, node C has a signal which fully overlaps node E and partially overlaps nodes A and F, but does not reach other nodes, such as D and H. Basic route discovery is based in part on the mechanism of ad hoc on-demand distance vector (AODV) as described by Perkins C et al, AODV routing (Request for Comment RFC3561), July 2003. As shown in FIG. 13, route discovery is initiated by the source node A broadcasting a PREQ message 21 containing the GPI (source IP address, destination IP address and path identifier) and a hop count which is initialised to zero. The PREQ is propagated through the network. When it reaches the destination Z, the destination responds with a PREP 22 which is propagated back to the source node along a shortest route, as shown in FIG. 14.

Each node, on receiving the PREQ for the first time, creates a path table entry for the GPI, containing the hop count from the PREQ and its BID. Then, unless it is the destination, it increments the hop count and broadcasts it to its neighbours, causing the PREQ to be propagated across the network. When a node receives a PREQ for which it already has a path record, it first checks if it has an out of date BID and discards it if it does. Otherwise the PREQ will only be propagated if it has a better (lower) hop count than previously seen or if it has a newer BID. The path record is updated if the PREQ is propagated.

Path set up messages contain route objects as follows: The record route object (RRO) is an ordered list of IP addresses recording the route taken by a PREQ. Each node propagating a PREQ will first append its IP address to the RRO object. The explicit route object (ERO) is a an ordered list of IP addresses and associated pointer (PTR) specifying the route to be taken by a PREP. Each node propagating a PREP will decrement the pointer and unicast the PREP to the IP address pointed to in the ERO. The destination will respond to the PREQ for the best route it has seen with a PREP. The PREP sets up the LSP for the initial path by configuring the MPLS forwarding tables in each node along it. The PREP contains the GPI and an ERO derived by the destination from the RRO provided by the PREQ. It is forwarded upstream along a shortest path between the source and destination by following the ERO. Each node forwarding the PREP, the destination and each intermediate node, forwards it to the node specified in the reverse route entry for the path. Before transmitting the PREP, the sending node selects from its own label space the label to be used for packets from the immediately preceding upstream node and updates the corresponding field in the PREP. On receipt of the PREP, each node stores the next hop label in its forwarding table entry for the path.

Figure 14:
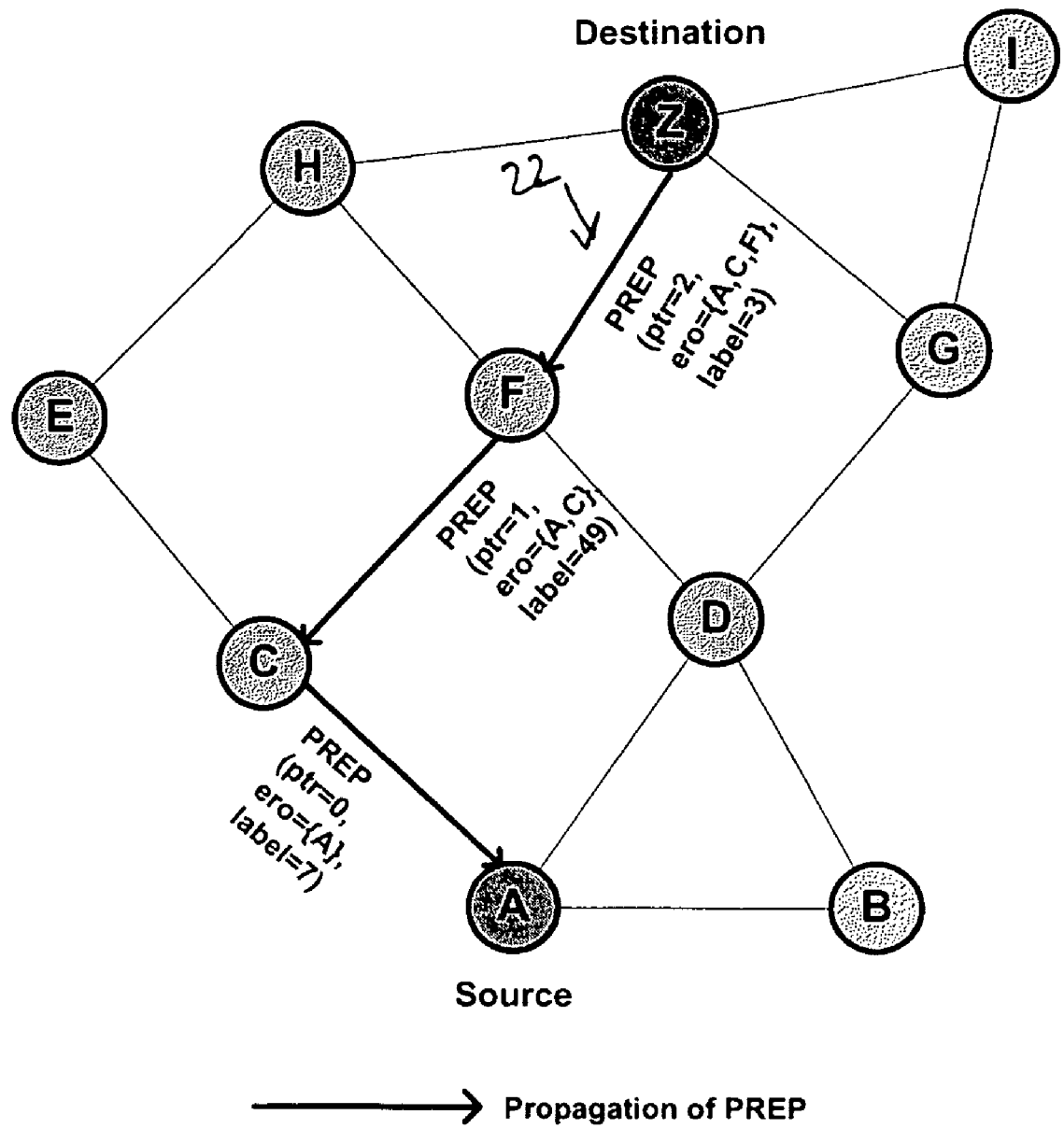
FIG. 14 illustrates initial path set-up in the network of FIG. 12.
Figure 15:
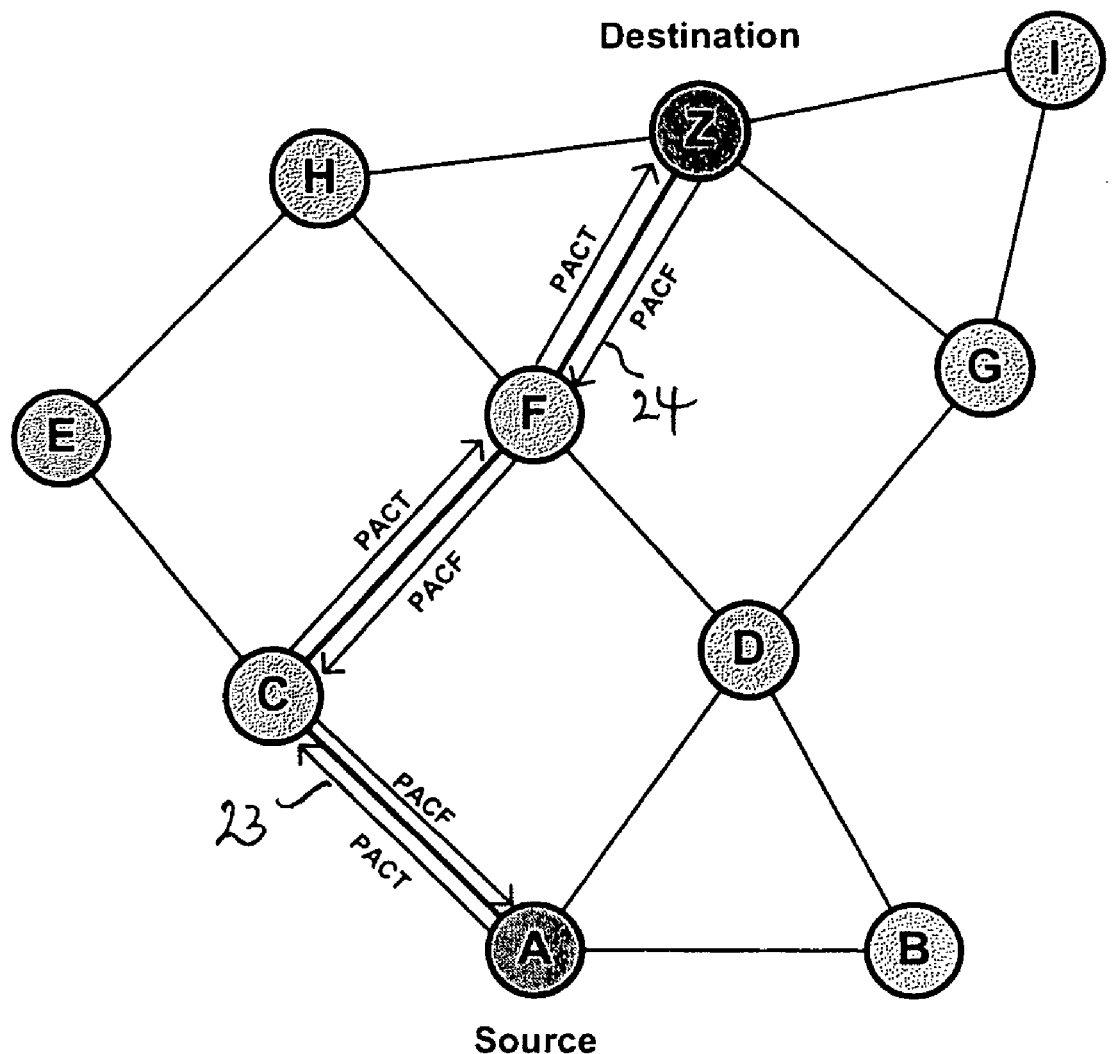
FIG. 15 illustrates path activation in the network of FIG. 12.

In the example shown in FIG. 14, Z has received the PREQ from F before it receives one from G. Normally the first PREQ seen by a destination will be for a shortest path. However, in the event that a PREQ is received for a better path, it will respond with a PREP with a higher PSN. The source will always use the path with the highest PSN. The source can start transmitting data along the path as soon as it has processed the PREP. Once the initial route has been established for the path, the path has to be activated. This is shown in FIG. 15. The source sends a path activate (PACT) message 23 to the destination along the path's. The destination replies with a path activate confirm (PACF) message 24 which retraces its steps. Activation functions to store the final distance from the source (hops) at each node in a node—this is needed for later bypass routing; to store the final PPID for the path partner— this is required for disjoint path setup as is discussed below; to store the current PSN for the path; to initiate protection of the network elements along the path—when a node receives the PACF message, it initiates the setup of bypasses for any downstream network elements it owns; and to initiate link monitoring. The source does not have to wait for completion of the activation process before it starts using the path for data transfer. It can send packets as soon as it has received the PREP providing the next hop label.

Figure 16:
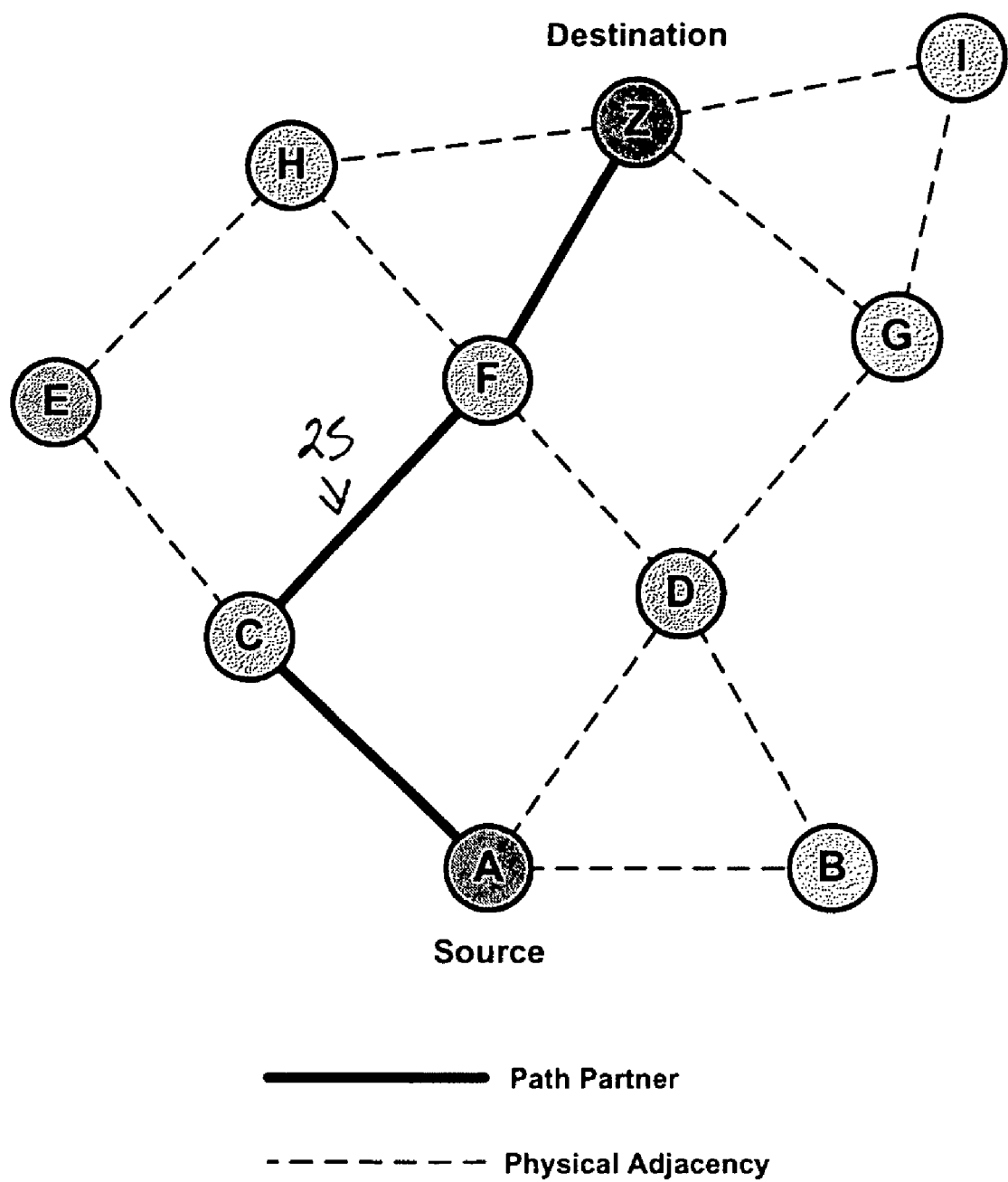
FIG. 16 shows an example initial primary path in the network of FIG. 12.

FIG. 16 shows the initial primary path 25 set up in the example used above. The path is susceptible to the loss of the links A-C, C-F AND F-Z due to failure or movement of nodes C or F, or change in radio conditions. Since it is currently assumed that each node will only have a single transceiver, the path is in effect susceptible to the loss of the nodes C and F. Additional resilience is provided by creating bypasses around these nodes. The node upstream of the protected node is responsible for setting up the bypass and performs the role of point of local repair, re-routing traffic if an error occurs.

In order to set up a backup, a modified form of route discovery is performed, initiated by the point of local repair (PLR). The PLR broadcasts a bypass request (BREQ) 26 containing the GPI of the resilient virtual path and the IP address of the node to be protected. The actions carried out by nodes receiving the BREQ are the same as those when receiving a PREQ except for the following: If the receiver finds itself to be the protected node, it silently discards the message. If the receiver is not on either of the RVP's path partners it appends its own IP address to the RRO object, increases the hop count and broadcasts the BREQ. If the receiver is on the path partner but is closer to the source than the PLR, it silently discards the message. If the receiver is on the path partner and is further from the source than the PLR it is a potential join point. It returns a BREP containing the cost of the bypass. The cost of the bypass is the number of hops by which the length of the partner path would increase if it were rerouted via the bypass. The join point will now have two forwarding entries for the GPI, each with identical next hop information, one for packets arriving from the predecessor hop on the path partner, the other for packets arriving from the predecessor hop on the bypass.

Figure 17:
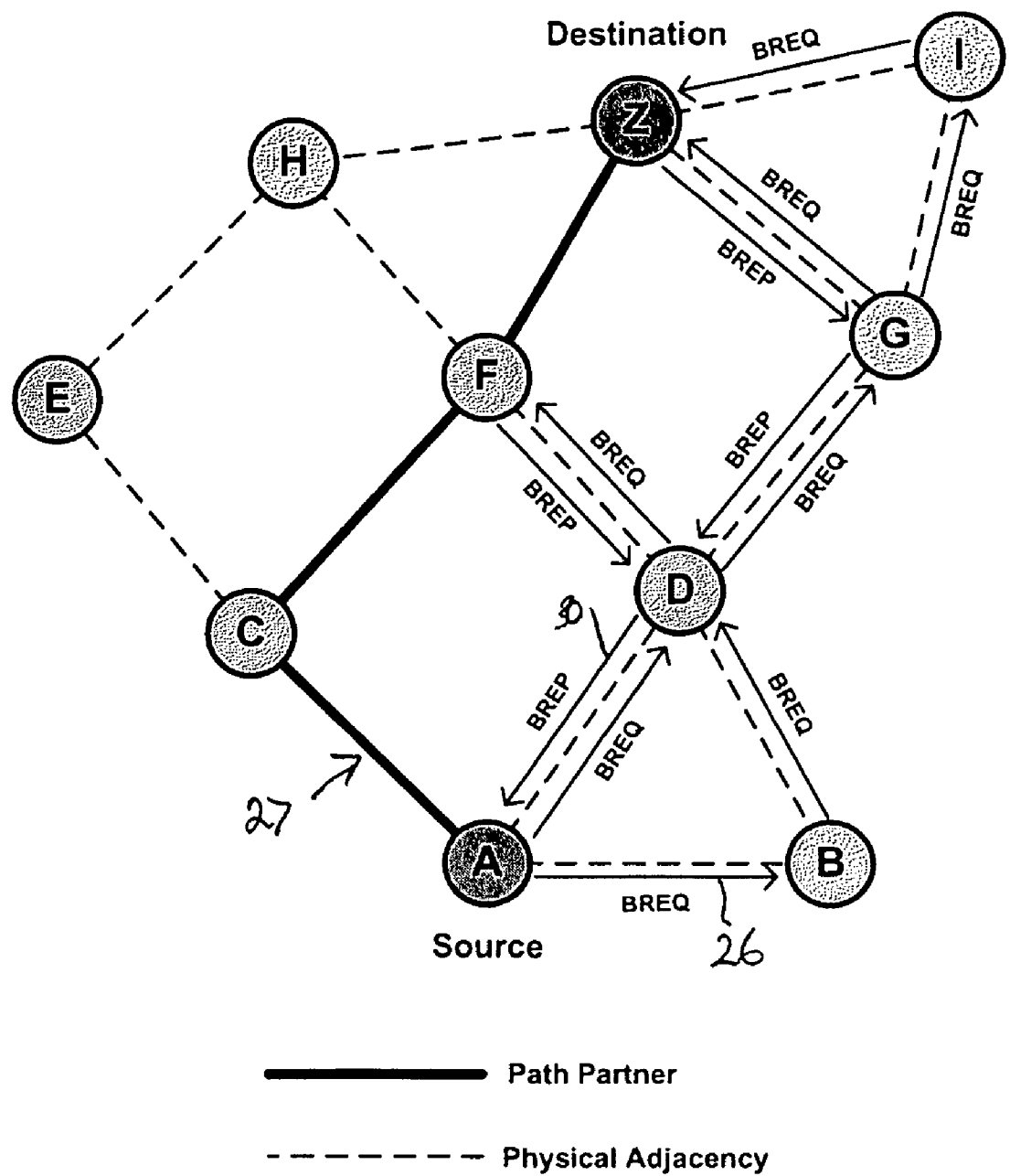
FIG. 17 shows an example bypass set-up in the network of FIG. 12.
Figure 18:
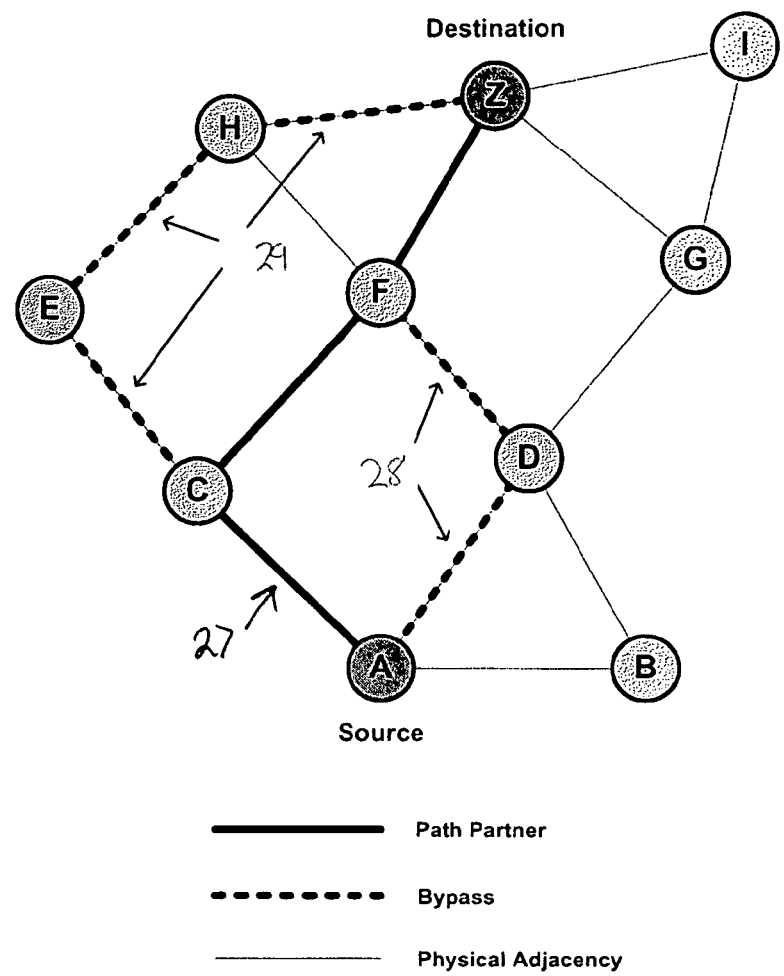
FIG. 18 shows bypasses in the network of FIG. 12.

An example message flow for the set up of a backup for C, initiated by A, is shown in FIG. 17. The PLR will use the best bypass based on cost. If it detects failure of the protected node it will immediately update the MPLS forwarding database so that packets will follow the bypass. Example backup sections for C and F are shown in FIG. 18. A-C-F-Z is a path partner 27 and A-D-F forms a bypass 28 for C, whilst C-E-H-Z forms a bypass 29 for F. In general the number of hops in a bypass is kept small, rejoining the primary path shortly after the node being backed up. This means that the well known expanding ring search (ERS) technique can be employed in order to reduce the overall signalling load required for backup path setup. This technique uses the time to live (TTL) field in the BREQ to restrict the number of hops that it may propagate. The TTL is set to the required hop limit by the initiator. Each node receiving the BREQ 26 decrements the TTL and only forwards the packet if it is still greater than zero. The point of local repair uses successively larger search radiuses until a BREP 30 is received. Tuning of this aspect would require simulation, but an initial TTL of 2 seems to be a good starting point.

Figure 19:
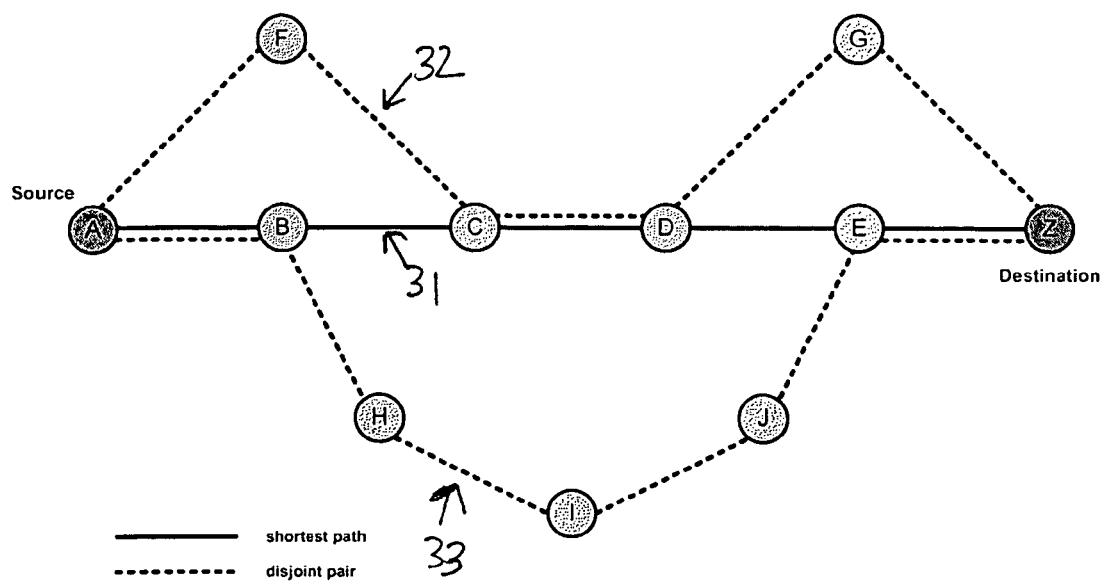
FIG. 19 shows an example topology for disjoint pair set-up in the network of FIG. 12.

Generally, ERS has the disadvantage that it increases setup time in the case where a response is not received to the first broadcast. However minimising setup time is not important for the backup LSPs since they are not required until the protected node is lost. As has been discussed above, a naïve algorithm will sometimes be unable to find a disjoint pair or will find a sub-optimal pair. The algorithm employed by AORP is a distributed one based on a centralised algorithm due to Bhandari described in Bhandari R, Survivable networks: algorithms for diverse routing, Kulwer Academic Publishers, 1999. The algorithm will be explained using the example topology shown in FIG. 19. In this topology, a disjoint pair is possible with A-F-C-D-G-Z 32. and A-B-H-I-J-E-Z 33. However the shortest path A-B-C-D-E-Z 31 cannot be a member of a shortest disjoint pair.

Figure 20:
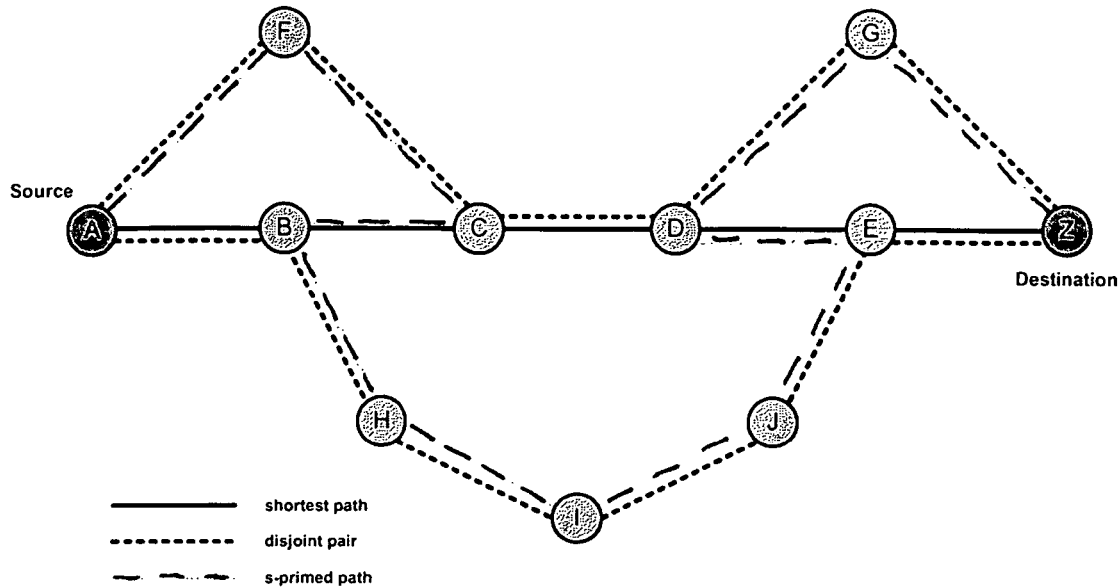
FIG. 20 shows an S-primed path in the topology of FIG. 19.

FIG. 20 introduces what is termed the S-primed path. This is a shortest path which includes all links which belong to the disjoint pair but are not on the shortest path and all links which are on the shortest path but are not on the disjoint pair, i.e. there is no duplication, hence the S-primed path in this example is A-F-C-B-H-I-J-E-D-G-Z, for disjoint pairs A-F-C-D-G-Z and A-B-H-I-J-E-Z. The shortest path in this case is A-B-C-D-E-Z The disjoint pair is produced from the shortest path and the S-primed path by adding the links from both except those which belong to both. Thus the strategy for finding a shortest disjoint pair is as follows: Find a shortest path (S); find an S-primed path; eliminate the links which are common to S and S-primed; combine the remaining links to produce the shortest disjoint pair. When finding the S-primed path, each link which is common to S is given a cost of −1. This is because these links are not present in the resulting disjoint pair and make no contribution to its cost. Thus the cost of the disjoint pair is minimized by minimizing the cost of the S-primed path.

Figure 21:
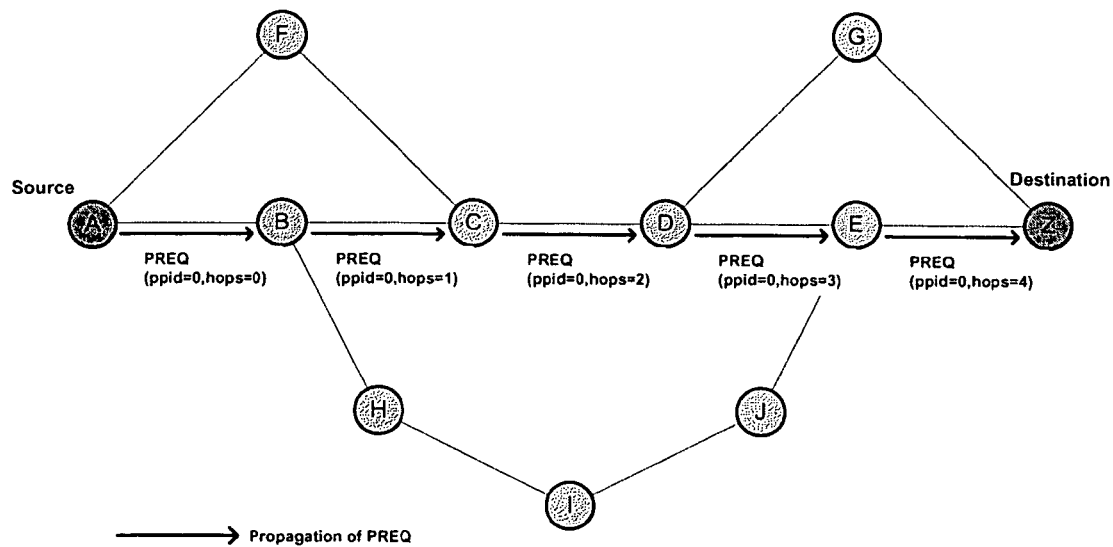
FIG. 21 shows shortest (S) path set-up in the topology of FIG. 19.

The means by which the disjoint pair is found using the distributed AORP protocol is now explained. The first step is illustrated in FIG. 21. The source A initiates a PREQ for the shortest path A-B-C-D-E-Z propagating in this direction and specifying a PPID of 0 (the first). The best PREQ seen by the destination will be that for A-B-C-D-E-Z. The PREQs propagated for paths which are not the shortest are not shown. The destination responds with a PREP along the shortest path. Each node on S will now have a record of the path.

Figure 22:
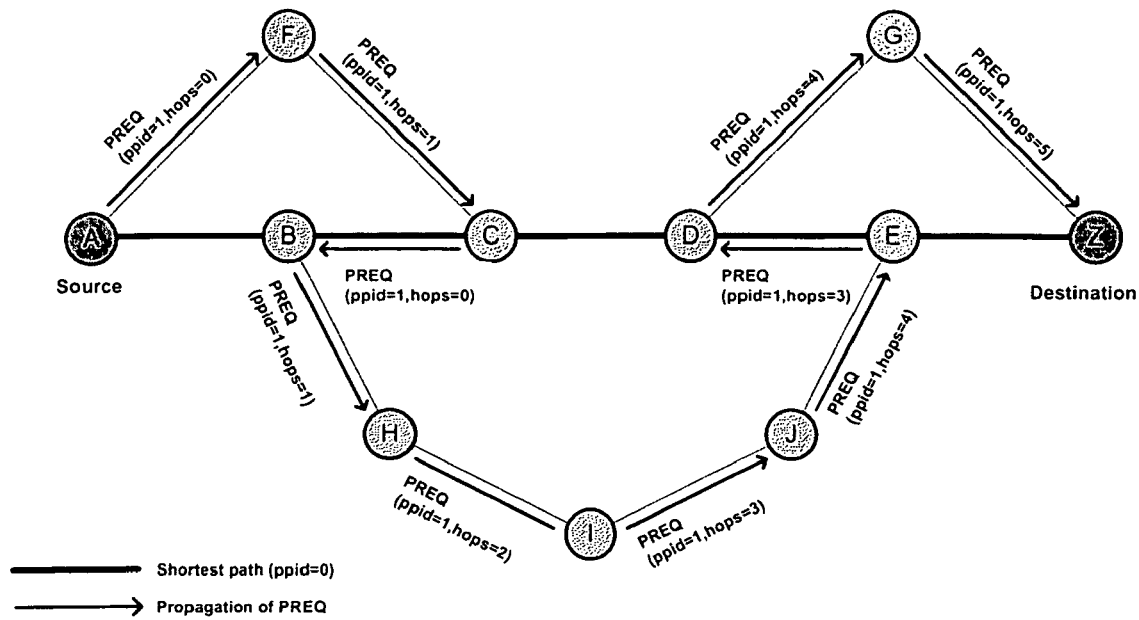
FIG. 22 shows S-primed (S') path set-up.

On receipt of the PREP for S, the source initiates the search for S-primed by broadcasting a PREQ with PPID=1. This is termed the PREP-primed. FIG. 22 shows the propagation of the PREQ-primed in the example and shows the hop accounting as it traverses each node. Only the PREQs for the S-primed path are shown. When processing the PREQ-primed, intermediate nodes, those which are neither source nor destination, belong to one of two sets: those that are on the shortest path, termed on-shortest or on-S; and those that are not on the shortest path, termed off-shortest or off-S. Nodes which are off-S have no current path matching the GPI. They are not aware that the PREQ is for an S-primed. They propagate the PREQ by broadcast in the normal way. Nodes which are on-S process the PREQ-primed according to the following rules. In all cases, a PREQ is only propagated if it has a new BID or a better (lower) hop count. If it is received from a node which is off-S, its hop count is decremented and it is propagated by unicast to the predecessor node on S. For example, if C receives a PREQ-primed from F, it unicasts it to B. If it is received from a node which is on-S and closer to the source, i.e. from the predecessor on S, it is discarded. For example, if C receives a PREQ-primed from B, it discards it. If it is received from a node which is on-S but further from the source, i.e. from the successor on S, its hop count is incremented and it is propagated by broadcast. For example, if C receives a PREQ-primed from D, it broadcasts it.

It is important to realise that the PREP for S will configure a LSP along S so that data transfer from A to Z can begin immediately without waiting for subsequent signalling to complete. The path remains unprotected at this stage however.

Figure 23:
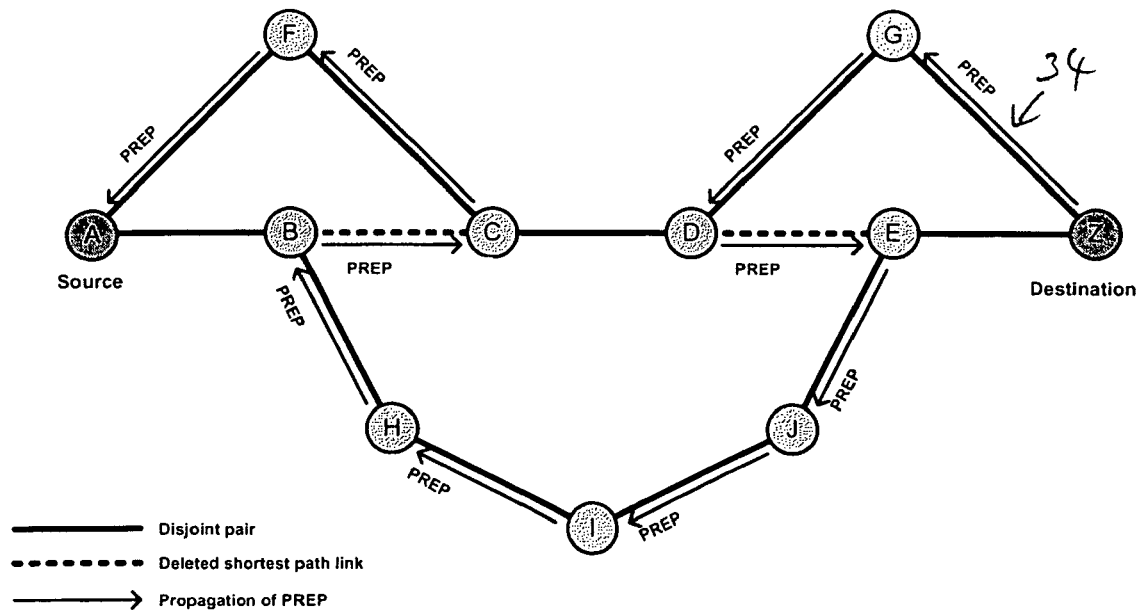
FIG. 23 shows a configuration of disjoint pair by PREP-primed.

In the simple case where the disjoint pair can include the path S without modification, S-primed will be disjoint from S. In such a case, the AORP algorithm will find a pair that could be found by a naïve algorithm. On receipt of a PREQ-primed which is an improvement on that seen before, the destination responds with a PREP 34 which follows the ERO derived from the PREQ-primed, as shown in FIG. 23. Processing of the PREP by the intermediate nodes depends whether they are on-S or off-S. Nodes which are off-S process the PREP in the normal way. They set up the label switching state for the path and unicast the PREP to next node in the ERO.

Nodes which are on-S process the PREP according to the following rules. If it is received from a node which is off-S, the label switching state for the path is modified so that the path is now switched from the upstream link on S to the link on S-primed on which the PREP arrived. The PREP is unicast to next node in the ERO, which will be the downstream on-S. For example, when D receives the PREP from G, D modifies the label switching state for the LSP so that packets arriving from C are switched to G. D then unicasts the PREP to E. If the PREP is received from a node which is on-S, which will be the node upstream on-S, the PREP is unicast to the next node in the ERO, which will be off-S, specifying the label already allocated for S and previously communicated to the upstream node on S. For example, when E receives the PREP from D, E unicasts it to J, providing the label previously provided to D.

Figure 24:
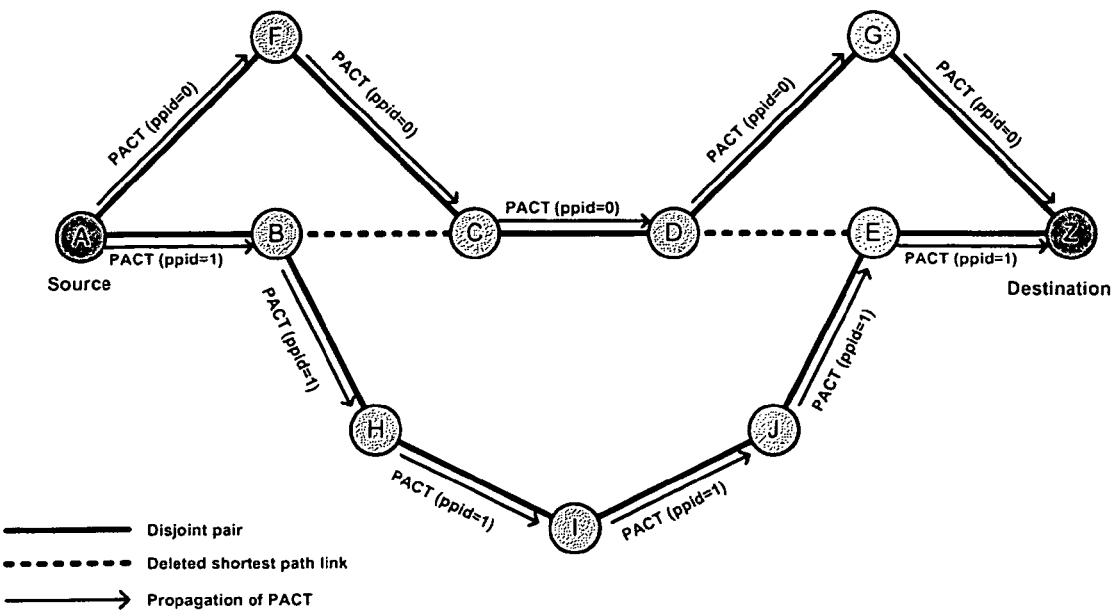
FIG. 24 illustrates activation of disjoint paths.

The management of the label switching state during PREP processing is such that there is always a contiguous LSP from source to destination so that data can always be transferred end to end. The route taken by the LSP changes whenever a PREP is processed from off-S. When the PREP has been processed at the source, the two disjoint LSPs will be set up. Data can now be transferred end to end along both. On receipt of the PREP signalling that the disjoint pair is setup, the source activates both paths by sending a PACT on each, as shown in FIG. 24. Each PACT has a different PPID so that the paths will take different PPIDs.

Link monitoring is necessary for a technique which performs re-routing on failure, since this relies on early detection of link and node failure. It is possible that the underlying media access control (MAC) layer will provide suitable mechanisms. However, if this is not the case, link monitoring must be performed by a higher layer. The AORP protocol is independent of the particular link monitoring technique employed, although rapid detection of failure is required in order to provide low fail over times. The topic has already been the subject of research in the Mobile ad-hoc network (MANET) area. A sophisticated mechanism is defined in Ogier R, et al: Topology Dissemination Based on Reverse Path Forwarding (RFC3684) February 2004, which could be used.

Failure of a link or node on the primary path is detected by the node on the primary path upstream of the failure. The node acts as point of local repair. The node detecting the failure has an operational bypass protecting the failed element and performs local repair procedures as follows. The node simply updates its LSP forwarding table to use the bypass LSP section and in so doing alters the active path of the virtual path to avoid the point of failure. The active path may now have unprotected elements. The point of local repair sends a path error (PERR) (repaired=TRUE) upstream to trigger the source to reactivate the path. The failed element is un-protected. It is assumed that this can only happen because the point of local repair has been unable to create a bypass. It sends a PERR message upstream. The PERR is intercepted by the first node that has a bypass which avoids the failed element. This performs local repair procedures as described above and sets repaired=TRUE before propagating it. In the event that the PERR reaches the source node without repair having occurred, the source node must re-establish a complete active path. If a node detects failure on a bypass, if it is the owner, it immediately attempts to re-establish a replacement. If the detecting node is not the owner, it sends a BERR upstream to the owner to trigger it to re-establish a replacement.

If local repair is not possible for one partner of a disjoint pair, the source node will commence re-establishment. The remaining partner is treated as the shortest path and a new s-primed path is sought using repeated PREQ-primed. It does not matter if the remaining partner is not physically a shortest path, the algorithm will still succeed in finding a disjoint pair once such is possible, that is once the changing topology allows. Neither does the PPID of the remaining path matter. Search for the S-primed path is independent of the PPID of the effective shortest path. As is the case for initial disjoint pair establishment, the pair may include links from the shortest path or the second partner may be disjoint from the shortest path.

As nodes move and errors occur, the active path taken by an path will change as a result of the local repair, so that it becomes significantly sub-optimal. Two measures are taken to reduce this problem. Whenever a point of local repair creates a bypass, if it detects that the path to the destination via the bypass is actually shorter than that via the primary path, it simulates local repair of the protected node. The part of the original active path that is replaced takes on the role of bypass for the time being. Each PLR periodically attempts to set up an alternative lower cost bypass. Each node performs ageing of LSP forwarding table entries and deletes those that are not used. In order to maintain primary LSPs and bypass LSP sections, the initiators may send null data packets with no user data, when there is no real traffic. In order to provide quality of service (QoS), each node only propagates a PREQ or BREQ if it has sufficient free bandwidth to support it. A node reserves bandwidth on receipt of a PREP or BREP. If on receipt of a PREP or BREP there is no longer sufficient bandwidth to support the request, then the message is discarded.

Protocol definition and message formats are illustrated in tables 4 to 15 below.

TABLE 4

PREQ message fields
Path request (PREQ)

| Field | Usage |
|---|---|
| Type | Type = 1 (PREQ) |
| Psa | Path source IP address |
| Pda | Path destination IP address |
| Pid | Path identifier |
| Psn | Path sequence number |
| Ppid | Path partner identifier |
| Bid | Broadcast id |
| Hops | Number of hops sender is from the path source |
| Rro | Record route object |

TABLE 5

PREP message fields
Path Reply (PREP)

| Field | Usage |
|---|---|
| Type | Type = 2 (PREP) |
| Psa | Path source IP address |
| Pda | Path destination IP address |
| Pid | Path identifier |
| Psn | Path sequence number |
| Ppid | Path partner identifier |
| Hops | Number of hops sender is from path source |
| Ero | Explicit route object |
| Ptr | Pointer into the explicit route object |
| Label | Label to be used by the upstream node |
| Ppsn | Psn of the other partner |

TABLE 6

PACT message fields
Path activate (PACT)

| Field | Usage |
|---|---|
| Type | Type = 3 (PACT) |
| Psa | Path source IP address |
| Pda | Path destination IP address |
| Pid | Path identifier |
| Psn | Path sequence number |
| Ppid | Path partner identifier |
| Hops | Number of hops sender is from path source |
| Protected | IP address of the protected node which was bypassed during local repair. Only set when PACT is following a bypass. Set to 0.0.0.0 otherwise. |
| Bpsn | PSN of the bypass which was used during local repair. Only set when PACT is following a bypass. Set to 0 otherwise |

TABLE 7

PACF message fields
Path Activate Confirm (PACF)

| Field | Usage |
|---|---|
| Type | Type = 4 (PACF) |
| Psa | Path source IP address |
| Pda | Path destination IP address |
| Pid | Path identifier |
| Psn | Path sequence number |
| Ppid | Path partner identifier |

TABLE 8

PERR message fields
Path Error (PERR)

| Field | Usage |
|---|---|
| Type | Type = 5 (PERR) |
| Psa | Path source IP address |
| Pda | Path destination IP address |
| Pid | Path identifier |
| Psn | Path sequence number |
| Ppid | Path partner identifier |
| Repaired | Set to TRUE if local repair of the fault was achieved. Set to FALSE otherwise. |

TABLE 9

PECF message fields
Path Error Confirm (PECF)

| Field | Usage |
|---|---|
| Type | Type = 6 (PECF) |
| Psa | Path source IP address |
| Pda | Path destination IP address |
| Pid | Path identifier |
| Psn | Path sequence number |
| Ppid | Path partner identifier |

TABLE 10

BREQ message fields
Bypass Request (BREQ)

| Field | Usage |
|---|---|
| Type | Type = 7 (BREQ) |
| Psa | Path source IP address |

TABLE 10-continued

BREQ message fields
Bypass Request (BREQ)

| Field | Usage |
| --- | --- |
| Pda | Path destination IP address |
| Pid | Path identifier |
| Psn | Path sequence number |
| Ppid | Path partner identifier |
| Bid | Broadcast id |
| Hops | Number of hops sender is from PLR |
| Rro | Record route object |
| Plr | IP address of the point of local repair |
| plrHops | Distance in hops of the point of local repair from the path source |
| Protected | IP address of the node which is to be protected by the bypass |

TABLE 11

BREP message fields
Bypass Reply (BREP)

| Field | Usage |
| --- | --- |
| Type | Type = 8 (BREP) |
| Psa | Path source IP address |
| Pda | Path destination IP address |
| Pid | Path identifier |
| Psn | Path sequence number |
| Ppid | Path partner identifier |
| Plr | IP address of the point of local repair |
| Cost | Number of hops the bypass would add to the partner |
| Ero | Explicit route object |
| Ptr | Pointer into the explicit route object |
| Label | Label to be used by the upstream node |

TABLE 12

BACT message fields
Bypass Activate (BACT)

| Field | Usage |
| --- | --- |
| Type | Type = 9 (BACT) |
| Psa | Path source IP address |
| Pda | Path destination IP address |
| Pid | Path identifier |
| Psn | Path sequence number |
| Ppid | Path partner identifier |
| Plr | IP address of the point of local repair |
| Protected | IP address of the node which is to be protected by the bypass |

TABLE 13

BACF message fields
Bypass Activate Confirm (BACF)

| Field | Usage |
| --- | --- |
| Type | Type = 10 (BACF) |
| Psa | Path source IP address |
| Pda | Path destination IP address |
| Pid | Path identifier |
| Psn | Path sequence number |
| Ppid | Path partner identifier |
| Plr | IP address of the point of local repair |
| Protected | IP address of the node which is to be protected by the bypass |

TABLE 14

BERR message fields
Bypass Error (BERR)

| Field | Usage |
| --- | --- |
| Type | Type = 11 (BERR) |
| Psa | Path source IP address |
| Pda | Path destination IP address |
| Pid | Path identifier |
| Psn | Path sequence number |
| Ppid | Path partner identifier |
| Plr | IP address of the point of local repair |
| Protected | IP address of the node which is to be protected by the bypass |

TABLE 15

BECF message fields
Bypass Error Confirm (BECF)

| Field | Usage |
| --- | --- |
| Type | Type = 12 (BECF) |
| Psa | Path source IP address |
| Pda | Path destination IP address |
| Pid | Path identifier |
| Psn | Path sequence number |
| Ppid | Path partner identifier |
| Plr | IP address of the point of local repair |
| Protected | IP address of the node which is to be protected by the bypass |

Figure 25:
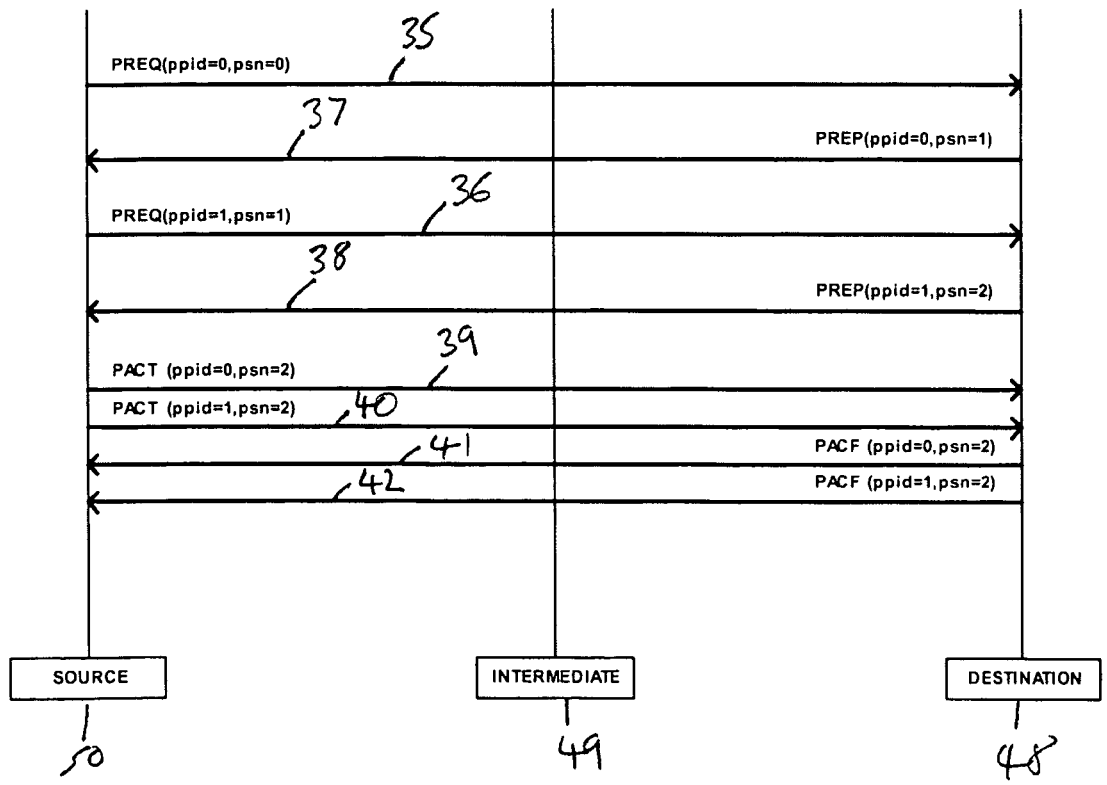
FIG. 25 is a message sequence chart for path setup.
Figure 26:
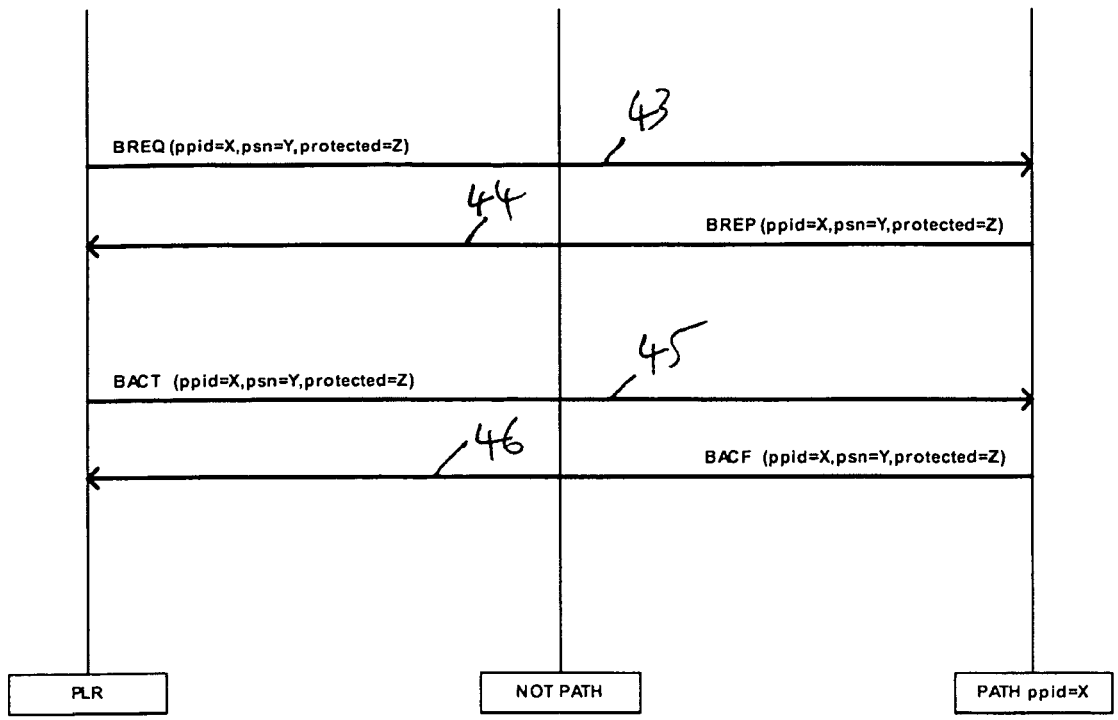
FIG. 26 is a message sequence chart for bypass setup.

FIGS. 25 to 31 are message sequencing charts. As shown in FIG. 25, for path setup, each path partner sends a PREQ 35, 36 with its respective path partner identifier (ppid) and path sequence number (psn) and receives a PREP 37, 38. A PACT 39, 40 is sent for each path partner and the destination replies with PACF message 41, 42 for each. The bypass set up is shown in FIG. 26 where a BREQ 43 is sent for the path partner, sequence number and protected node of concern and a BREP 44 is sent back, The bypass activated by BACT 45 and confirmed by BACF 46.

Figure 27:
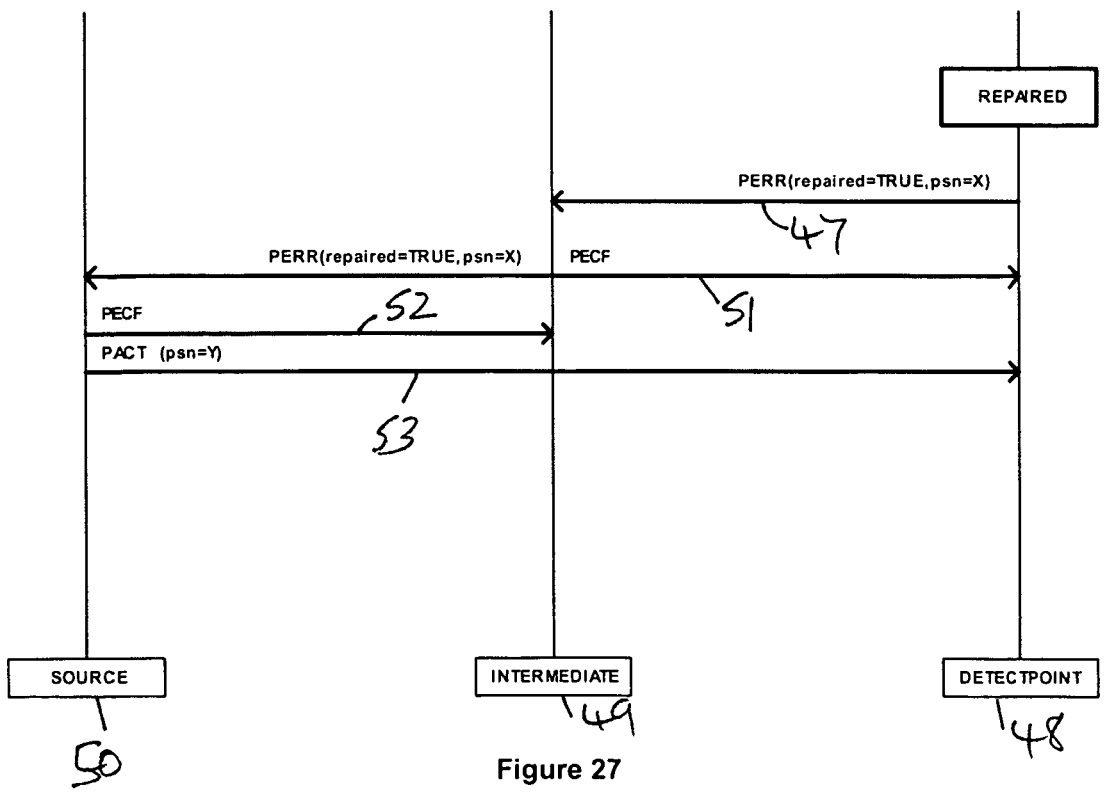
FIG. 27 is a message sequence chart for path error repair by detector.

FIG. 27 illustrates repair of a path error by the detecting node. A path error message 47 is sent from the detecting path 48, via an intermediate node 49, to the source 50 showing that a repair has been effected. The intermediate node sends a path error confirmation 57 and the source confirms 52 to the intermediate node. The source then sends a PACT 53 to the detecting point.

Figure 28:
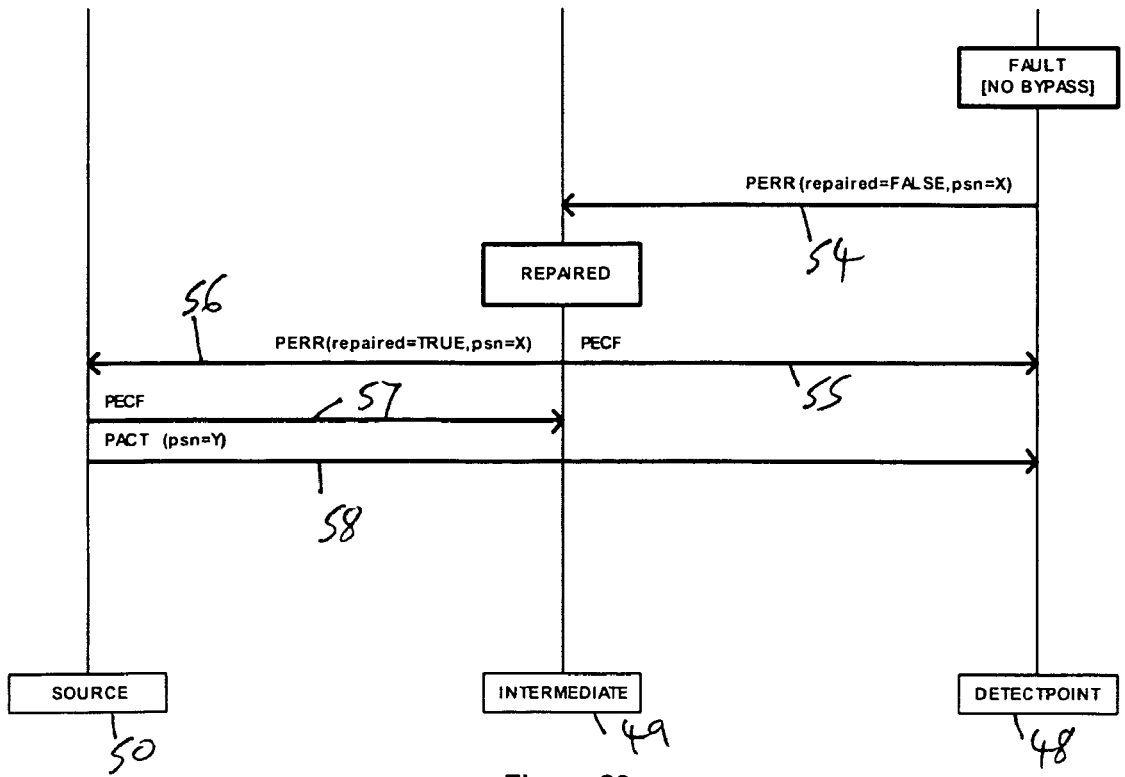
FIG. 28 is a message sequence chart for path error repair by intermediate.

In FIG. 28, the example shows path error repair by the intermediate node. The detecting point 48 sends a path error message 54 to the intermediate node indicating that there is no bypass and this is confirmed 55 to the detecting part. The intermediate node renders the repair and forwards the PERR 56 indicating that there has been a repair. A PECF 57 is returned to the intermediate node and a PACT 58 is sent to the detecting point.

Figure 29:
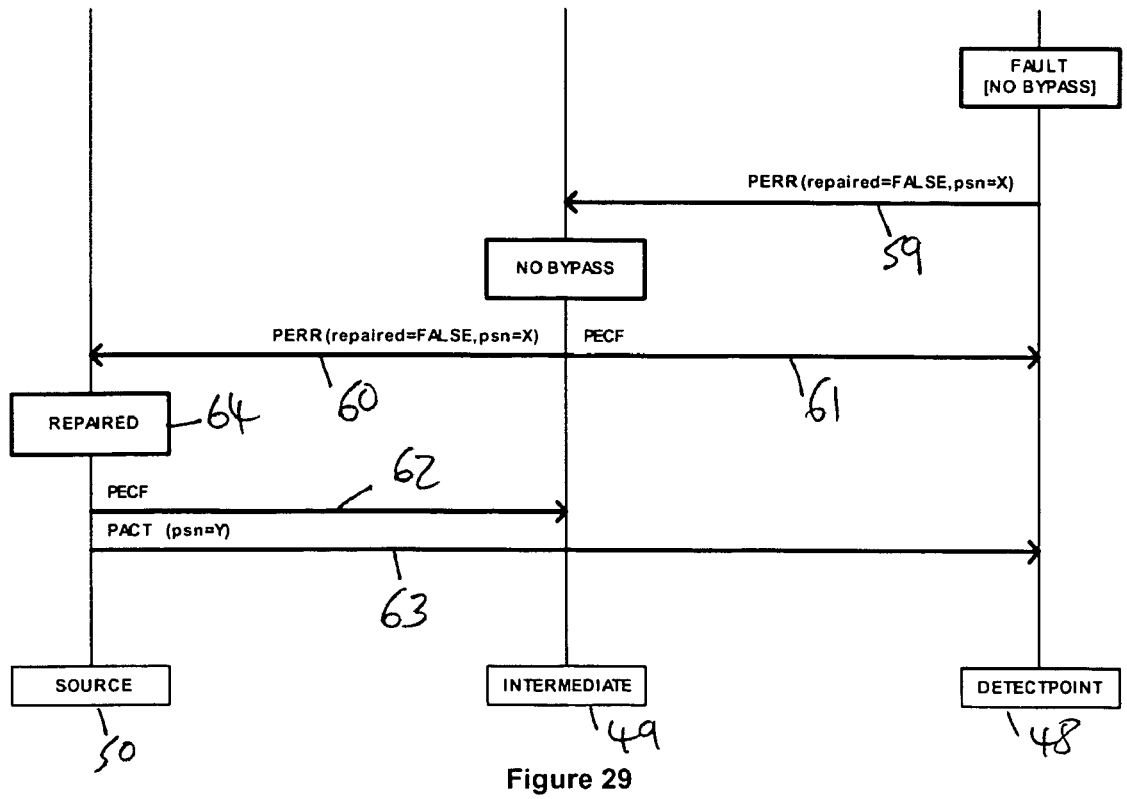
FIG. 29 is a message sequence chart for path error repair by source.
Figure 30:
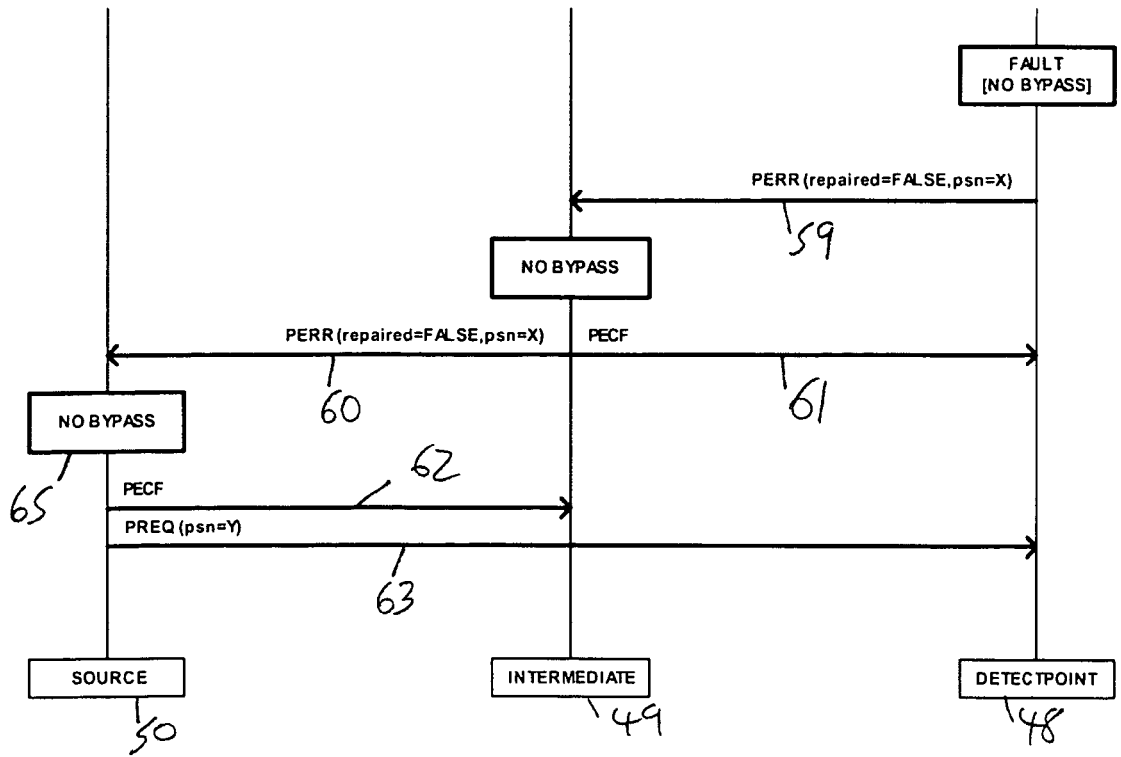
FIG. 30 is a message sequence chart for path error with no local repair.
Figure 31:
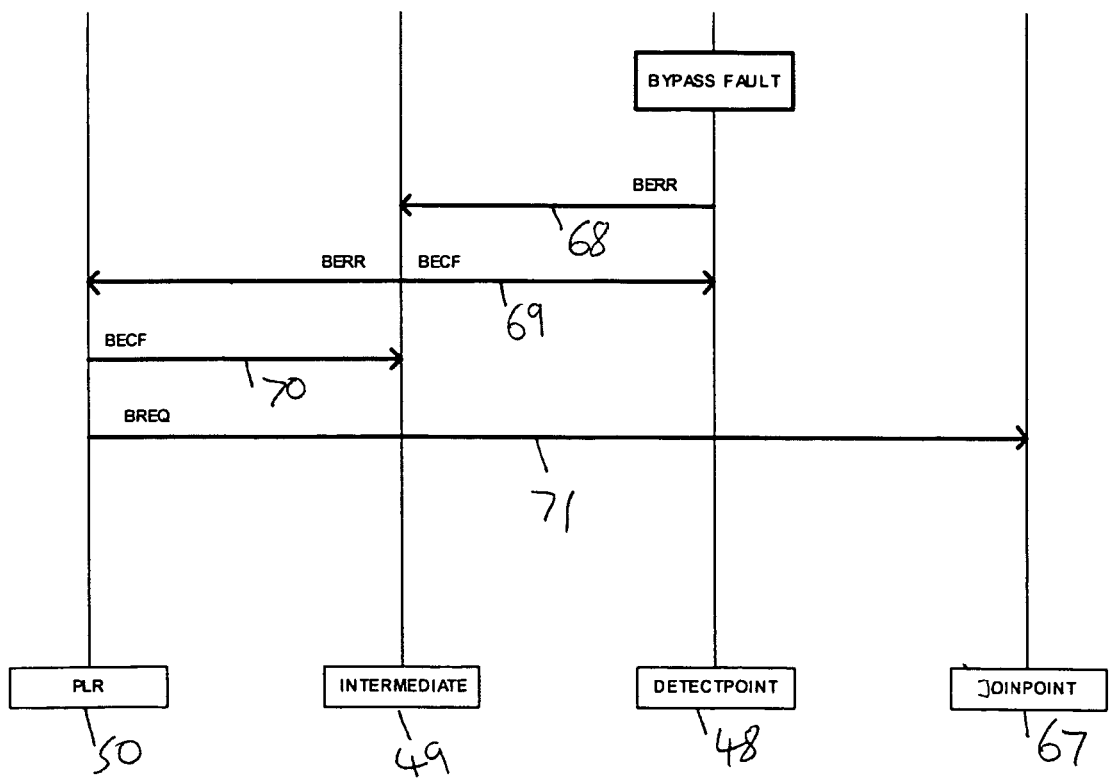
FIG. 31 is a message sequence chart for bypass error.

FIG. 29 shows a path error repair by the source 50. The detecting point 48 sends a PERR 59 indicating a fault and no bypass to the intermediate node, which does not effect a repair, so the PERR 60 is forwarded to the source and a PECF 61 returned to the detecting point. After the source has effected a repair 64, a PECF 62 and PACT 63 are sent to the intermediate node and detecting point respectively.

Where no local repair is possible the same series of messages are sent, with the distinction that instead of a repair at the source there is no bypass 65 found, as shown in FIG. 30.

If a fault occurs in a bypass rather than in a path partner, then a bypass error message 68 is sent to the intermediate node 49 and a point of local repair node 66. A BECF 69 is sent back from the intermediate node to the detecting point 48 and another 70 from the PLR to in intermediate node. The PLR then sends a BREQ to a new join point 63 which need not be the old join point.

In message processing, a field in the received message currently being processed is denoted rx.field (e.g. rx.psn, rx.bid); a variable in a path record currently being processed is denoted p.variable (e.g. p.psn, p.hops); and in the case that a path record has a variable for each partner, each instance is denoted p[ppid].variable (e.g. p[0].hops for the hops variable of ppid 0 at the destination). A PSN is out of date if it is numerically lower than the highest seen before for the partner or bypass of resilient virtual path. A PREQ BID is out of date if it is numerically lower than the highest seen before for the resilient virtual path. A BREQ BID is out of date if it is numerically lower than the highest seen before for the resilient virtual path.

The source broadcasts a PREQ when a resilient virtual path is requested. The source starts a timer whenever it broadcasts a PREQ. On expiry of the timer, the PREQ is re-broadcast. For each GPI, the BID is set to 0 in the PREQ first broadcast. The BID is incremented prior to each subsequent broadcast. On receipt of a PREP for the first path partner, a PREQ is broadcast for the second partner specifying a different PPID. Any PREQ received at the source is ignored. At the intermediate node, if the PREQ has an out of date PSN it is discarded and if the PREQ has an out of date BID it is discarded. If the node has seen this GPI before and rx.psn does not match p.psn, then the PREQ is treated as a PREQ-primed, otherwise it is treated as PREQ-s. Hop accounting depends on whether the PREQ is PREQ-primed or PREQ-s. In the case of PREQ-s, assessment of the cost of a route is independent of the route by which it arrives at the node and a single record of the hops is maintained. In the case of PREQ-primed, assessment of the cost of a route depends on the route by which it arrives at the node and a record of the hops is maintained per adjacent node from which the PREQ can arrive. In the case of a PREQ-primed, if it arrived from the predecessor node on the shortest path, the PREQ is ignored. In the case of PREQ-primed arriving from the successor node on the shortest path, the cost of the route to this point is calculated as rx.hops−1. Otherwise the cost of the route to this point is calculated as rx.hops+1. If the PREQ has the current BID, but does not represent an improved route (smaller number of hops) it is discarded. The node's IP address is added to the RRO object and the hops field is set to the cost to this point. In the case of RREQ-primed received from a node not on the shortest path, the RREQ is unicast to the predecessor on the shortest path. Otherwise it is broadcast.

The destination is responsible for selecting the best path partner for a given GPI, PSN and BID. The destination will allocate one label for the resilient virtual path which shall be used for both partners. If the PREQ has an out of date PSN it is discarded. If the PREQ has an out of date BID it is discarded. If the PREQ has the current BID, but does not represent an improved route (smaller number of hops) it is discarded. If the PREQ was received from a node which is the predecessor of the other partner it is discarded. Otherwise, an ERO is constructed from the RRO of the PREQ and the PSN is incremented. A PREP is transmitted to the next hop in the ERO containing the destination's label, the ERO and with the PPSN set to the PSN of the other partner. At the source node, if the PREP has an out of date PSN it is discarded. The label switching state for the path partner is updated with the label provide by the neighbour sending the PREP. The successor node for the partner is set to the node from which the RREP was received. If only one partner is now setup, the PREQ for the other partner is broadcast containing the PSN provided by the destination. If both partners are now setup, both partners are activated.

At the intermediate node, if the PREP has an out of date PSN it is discarded. Each intermediate will allocate one label for each resilient virtual path.

If the rx.psn does not match p.psn, the PREP is treated as a PREP-primed. Otherwise it is treated as PREP-s. Receipt of a PREP-primed from the successor node of the shortest path is a protocol error. On receipt of a valid PREP the label switching state and the routing state (predecessor and successor) are updated. On receipt of a PREP-s, the label switching state for the path partner is updated with the label provide by the neighbour sending the PREP. The predecessor is set to the next hop in the ERO and the successor is set to the node from which the RREP was received. On receipt of a PREP-primed from a node which is not on the shortest path, the label switching state for the path partner is updated with the label provide by the neighbour sending the PREP. The predecessor is left unchanged and the successor is set to the node from which the RREP was received. On receipt of a PREP-s from the predecessor on the shortest path, the predecessor is set to the next hop in the ERO and the successor is left unchanged. The label switching state for the path partner is updated to expect packets from the new predecessor. The ERO is decremented and the PREP containing the node's label is transmitted to the next hop in the ERO. Receipt of a PREP at the destination is a protocol error.

At the source node, on receipt of the PREP for the first path partner, an activation timer will be started. The timer is cancelled when the PREP for the second partner is received. If the timer expires, a PACT is sent for the single open path so that this may be protected with bypasses. On receipt of the PREP for the second partner, a PACT is sent for each partner. A PACT timer is started when a PACT or pair of PACTs is sent. If the timer expires, each outstanding, unconfirmed PACT is resent. When any outstanding PACTs are confirmed by receipt of corresponding PACFs, the timer is cancelled. Receipt of a PACT at the source is a protocol error.

At the intermediate node, receipt of a PACT with an out of date PSN or from a node which is not the predecessor is a protocol error. If rx.protected is not 0.0.0.0, then the node carries a bypass that has been used for local repair. The predecessor and successor for the partner are set to those of the bypass. If the LSP is now down, a PERR should be generated towards the source and processing of the PACT terminated. The updated PPID, PSN and the hop count is stored. The hop count is incremented and the PACT is forwarded to the successor on the path. If local repair has been effected at this node, the PROTECTED field is set to the IP address of the failed node and BPSN to the PSN at the time of the failure. If this is a node on the bypass but not the endpoint of the bypass, these fields are left unchanged. Otherwise they are set to 0.0.0.0 and 0 respectively.

At the destination node, receipt of a PACT with an out of date PSN or from a node which is not the predecessor is a protocol error. A PACF is sent in response by unicasting to the predecessor on the path partner.

PACF processing at source node—Receipt of a PACF with an out of date PSN or from a node which is not the successor is a protocol error. Monitoring of the downstream link/node must be started, if this has not already been done. If the node's successor on the partner is not the destination, creation of a bypass to protect it is initiated by broadcasting a BREQ. Each time a BREQ is broadcast, the BID is incremented and a timer is started. If the timer expires, the broadcast of the BREQ is repeated. Receipt of a PACF confirms that routing via any bypasses following local repair is complete.

At the intermediate node, receipt of a PACF with an out of date PSN or from a node which is not the successor is a protocol error. Monitoring of the downstream link/node must be started, if this has not already been done. If the node's successor on the partner is not the destination, creation of a bypass to protect it is initiated by broadcasting a BREQ. Each time a BREQ is broadcast, the BID is incremented and a timer is started. If the timer expires, the broadcast of the BREQ is repeated. Receipt of a PACF confirms that routing via any bypasses following local repair downstream is complete. At the destination node, receipt at the destination is a protocol error.

At the source node, a PECF is unicast to the sender of the PERR. If rx.repaired is FALSE local repair via a bypass is attempted. If a bypass exists, the label switching state is updated to route the partner via the bypass. The state of the path partners is now assessed. If both are now up, the PSN is incremented and a PACT is transmitted for each. The PACT timer is started. Otherwise a set up of a partner is initiated by broadcast of a BREQ for a PPID that is down.

At the intermediate node, a PECF is unicast to the sender of the PERR. If rx.repaired is TRUE, the PERR is unicast to the predecessor node on the path partner. If rx.repaired is FALSE local repair via a bypass is attempted. If a bypass exists, the label switching state is updated to route the partner via the bypass. If local repair was achieved, a PERR with repaired set to TRUE is unicast to the predecessor node on the path partner. If local repair was not achieved, a PERR with repaired set to FALSE is unicast to the predecessor node on the path partner. A timer is started. If the timer expires, the PERR is retransmitted.

At the destination node a PERR is never generated, since the node will not detect path failure, so receipt of a PACF at the destination is a protocol error. Similarly, at the source node, receipt of PECF is a protocol error since the source node never generates a PERR. At the intermediate node, if the PECF matches an outstanding PERR, the PERR retransmission timer is cancelled and at the destination node, receipt of a PECF is a protocol error since the destination node never generates a PERR.

Any node on a path, other than the destination can act as a PLR for the successor on the path. The successor is termed the protected node. When the PACF is received the PLR initiates bypass setup by broadcast of a BREQ. The BREQ contains the IP address of the node to be protected, the partner PSN, and the distance of the PLR from the source node (PLRHOPS field). The HOPS field is initialised to 0. The source starts a timer whenever it broadcasts a BREQ. On expiry of the timer, the BREQ is re-broadcast. The timer is cancelled on receipt of a corresponding BREP. For each GPI and node protected by the PLR, the BID is set to 0 in the BREQ first broadcast. The BID is incremented prior to each subsequent broadcast. Any BREQ received at the PLR is ignored.

In PECF processing at the bypass node, i.e. one that is not on either partner—the source and destination are not bypass nodes—if the BREQ has an out of date PSN it is discarded. If the BREQ has an out of date BID it is discarded. Otherwise the cost of the route to this point is calculated as rx.hops+1. If the BREQ has the current BID, but does not represent an improved route (smaller cost) it is discarded. Otherwise, the node's IP address is added to the RRO object and the BREQ is broadcast with the HOPS field set to the cost.

In PECF processing at the join point, i.e. at a node other than the protected node which is on the same partner as the protected node and is further from the source node than the PLR—the destination may be a join point, but the source is not a join point—if the BREQ has an out of date PSN it is discarded. If the BREQ has an out of date BID it is discarded. Otherwise the cost of the route to this point is calculated as rx.hops+1+rx.plrhops−p.hops where p.hops is the partner hop count at this node. If the BREQ has the current BID, but does not represent an improved route (smaller cost) it is discarded. Otherwise, a BREP is transmitted along the bypass towards the PLR. In PECF processing at other nodes, the BREQ is ignored.

The PLR may receive BREPs from more than one join node. The PLR is responsible for selecting the bypass with least cost. If the BREP has an out of date PSN it is discarded. If the BREP does not have a lower cost than that seen before, it is discarded. The label switching state for the path partner is updated with the label provided by the neighbour sending the BREP. The successor node for the bypass is set to the node from which the RREP was received and the bypass is activated. If the BREP has an out of date PSN it is discarded. Each bypass node will allocate one label for each resilient virtual path. On receipt of a valid BREP, the label switching state for the path partner is updated with the label provide by the neighbour sending the BREP. The predecessor is set to the next hop in the ERO and the successor is set to the node from which the BREP was received. The ERO is decremented and the BREP containing the node's label is transmitted to the next hop in the ERO.

At a join point, if a BREQ represents an improvement on any seen before, a BREP is transmitted along the bypass towards the PLR. An ERO is constructed from the RRO of the BREQ. A BREP is transmitted to the next hop in the ERO containing the destination's label, the ERO and the bypass COST. The predecessor on the bypass is recorded. This is the node which forwarded the BREQ. At other nodes, receipt of a BREP is a protocol error.

On receipt of the best BREP for the second partner, a BACT is sent towards the Join Point along the bypass by unicasting it to the successor node on the bypass. A BACT timer is started when a BACT is sent. If the timer expires, the BACT is resent. When the BACT is confirmed by receipt of corresponding BACF, the timer is cancelled. Receipt of a BACT at the source is a protocol error.

At a bypass node, receipt of a BACT with an out of date PSN or from a node which is not the predecessor is a protocol error. If the LSP is now down, a BERR should be generated towards the source and processing of the BACT terminated. Otherwise, the BACT is forwarded towards the Join Point along the bypass by unicasting it to the successor node on the bypass. At a join point, receipt of a BACT with an out of date PSN or from a node which is not the predecessor is a protocol error. A BACF is sent in response by unicasting to the predecessor on the path partner. At a PLR node, receipt of a BACF with an out of date PSN or from a node which is not the successor is a protocol error. Monitoring of the downstream link/node must be started, if this has not already been done and the BACT retransmission timer stopped.

At a bypass node, receipt of a BACF with an out of date PSN or from a node which is not the successor is a protocol error. Monitoring of the downstream link/node must be started, if this has not already been done. At a join point, receipt of a BACF at the destination is a protocol error. At a PLR node, aBECF is unicast to the sender of the BERR and if the PSN is out of date for the bypass, the PSN is ignored. Otherwise a set up of a replacement bypass is initiated by broadcast of a BREQ.

At a bypass node, if the node detects failure of the bypass downstream, a BERR is unicast to the predecessor node on the bypass and a timer is started. If the timer expires, the BERR is retransmitted. On receipt of a BERR from the successor node on the bypass, a BECF is unicast to the sender of the BERR. If the PSN is out of date for the bypass, this is ignored, otherwise, the BERR is unicast to the predecessor node on the bypass.

At a join point, if the node detects failure of the partner downstream, a BERR is unicast to the predecessor node on the bypass and a timer is started. If the timer expires, the BERR is retransmitted. Receipt at the destination is a protocol error.

At a PLR node, receipt at the source is a protocol error since it never generates a BERR. At a bypass node, if the BECF matches an outstanding BERR, the BERR retransmission timer is cancelled and at a join point, if the BECF matches an outstanding BERR, the BERR retransmission timer is cancelled.

The invention addresses the problem of resilient communications for applications requiring bandwidth reservations in an ad hoc network, providing protection from loss of 2 nodes with path repair being performed in less than a few tens of milliseconds. This makes the invention suitable for the support of applications such as critical real-time voice, video or multimedia feeds. The invention is based on the AORP path setup and routing protocol, which has a number of attributes in that it provides distributed routing requiring simple algorithms at each node and avoiding use of central management entities or nodes requiring special capabilities; setup of disjoint paths for use in conjunction with our patented splitter combiner technique is possible; and setup of bypasses to allow rapid local repair following loss of node or link as may be caused by node failure, node movement or change in radio conditions. The protocol allows continuous re-optimisation of path routes to adapt to changing topology; and path management which performs re-routing in a manner which is transparent to the carried traffic.

The invention claimed is:

1. A method of determining a shortest path in a network comprising a plurality of nodes, the method comprising: broadcasting a path request message from the source node; and
propagating the path request message through the network from node to node,
wherein, on first receipt of the path request message at each node, a hop count and broadcast identifier are stored,
wherein, when a path request message is received a second time at any node, it is only propagated if the new hop count is less than the stored hop count,
wherein the destination node replies to the source node along the path with the lowest hop count to set up the shortest path,
wherein the network is a mobile ad-hoc network operating distributed routing, using an ad-hoc on-demand resilient path protocol, and
wherein at least one of the nodes in the first and second paths does not have a fixed geographical location.

2. A method according to claim 1, wherein the method further comprises setting bypasses at each node and if the bypass is determined to be shorter, then converting the bypass to be the primary link at that node.

3. A method of forming a pair of node disjoint paths in a network comprising a plurality of nodes using a method of determining a shortest path including broadcasting a path request message from the source node; and propagating the path request message through the network from node to node, wherein, on first receipt of the path request message at each node, a hop count and broadcast identifier are stored, wherein, when a path request message is received a second time at any node, it is only propagated if the new hop count is less than the stored hop count, wherein the destination node replies to the source node along the path with the lowest hop count to set up the shortest path, wherein the network is a mobile ad-hoc network operating distributed routing, using an ad-hoc on-demand resilient path protocol, and wherein at least one of the nodes in the first and second paths does not have a fixed geographical location; the method further comprising determining a first shortest path and allocating each link in the path a cost of +1; determining a second shortest path and allocating to each link in that path which is also in the first shortest path a cost of −1; sending a path reply from the destination node back to the source node to create the disjoint pair from links belonging to the first and second shortest paths, but which do not belong to both paths.

4. A method of operating a network resilient to at least two points of failure; the method comprising setting first and second node-disjoint paths between a source node and a destination node; wherein the first and second node-disjoint paths are determined according to the method of claim 3; setting a primary link and a bypass at each node in the paths; propagating a message packet from the source node; at each subsequent node, checking validity of the primary link; and if the primary link is not valid, switching the message packet to the bypass.

5. A method according to claim 3, wherein the first and second node-disjoint paths are determined.

6. A method according to claim 4, wherein the message packet includes a label and each node switches the message packet to the primary link or the bypass, according to the label.

7. A method according to claim 6, wherein the label is used to derive an address in a memory store; and the node reads data from the memory store relating to the primary link or the bypass according to the label.

* * * * *